United States Patent
Martinelli et al.

(10) Patent No.: US 9,429,712 B2
(45) Date of Patent: Aug. 30, 2016

(54) DUAL-GANGED OPTICAL SWITCH

(71) Applicant: II-VI Incorporated, Saxonburg, PA (US)

(72) Inventors: Massimo Martinelli, Santa Clara, CA (US); Mark H. Garrett, Morgan Hill, CA (US); Aravanan Gurusami, Morgan Hill, CA (US); Brian Daniel, San Jose, CA (US)

(73) Assignee: II-VI INCORPORATED, Saxonburg, PA (US)

( * ) Notice: Subject to any disclaimer, the term of this patent is extended or adjusted under 35 U.S.C. 154(b) by 92 days.

(21) Appl. No.: 14/338,408

(22) Filed: Jul. 23, 2014

(65) Prior Publication Data

US 2016/0025934 A1    Jan. 28, 2016

(51) Int. Cl.
*G02B 6/35*    (2006.01)
*H04Q 11/00*    (2006.01)

(52) U.S. Cl.
CPC ............. *G02B 6/3546* (2013.01); *G02B 6/351* (2013.01); *G02B 6/3518* (2013.01); *H04Q 11/0005* (2013.01); *H04Q 2011/003* (2013.01); *H04Q 2011/0016* (2013.01); *H04Q 2011/0026* (2013.01); *H04Q 2011/0047* (2013.01); *H04Q 2011/0049* (2013.01)

(58) Field of Classification Search
CPC .................. H04Q 2011/0026; H04Q 2011/003
See application file for complete search history.

(56) References Cited

U.S. PATENT DOCUMENTS

| | | | |
|---|---|---|---|
| 5,960,133 A * | 9/1999 | Tomlinson | G02B 6/2931 385/18 |
| 6,307,986 B1 | 10/2001 | Duerksen et al. | |
| 6,628,856 B1 | 9/2003 | Costello et al. | |
| 6,690,849 B1 | 2/2004 | Dadap, Jr. et al. | |
| 6,975,788 B2 | 12/2005 | Basavanhally et al. | |
| 7,058,251 B2 | 6/2006 | McGuire, Jr. | |
| 7,162,118 B1 * | 1/2007 | Colbourne | G02B 6/3524 385/15 |
| 7,620,323 B2 | 11/2009 | Strasser et al. | |
| 7,676,126 B2 | 3/2010 | McLaughlin et al. | |
| 7,983,560 B2 | 7/2011 | Maki et al. | |
| 8,111,995 B2 | 2/2012 | Wisseman | |
| 8,315,490 B1 | 11/2012 | Yang et al. | |
| 2006/0245685 A1 | 11/2006 | Ducellier | |
| 2013/0209031 A1 * | 8/2013 | McLaughlin | G02B 6/3518 385/17 |
| 2014/0118737 A1 | 5/2014 | Martinelli et al. | |
| 2014/0161454 A1 | 6/2014 | Roorda | |

* cited by examiner

*Primary Examiner* — Nathan Curs
(74) *Attorney, Agent, or Firm* — Wendy W. Koba

(57) ABSTRACT

An optical switch is configured in a "dual-ganged" switch geometry to provide for the simultaneous switching of a selected transmit/receive pair of optical signal paths between a specific optical communication device and an optical communication network. A biaxially-symmetric signal redirection component may be used to direct the signals between the selected channel and the optical communication device. A specific waveguide (e.g., fiber) array topology within the dual-ganged switch (DGS) breaks the symmetry between the network transmit/receive arrays and a pair of transmit and receive signal paths associated with the communication device to improve isolation and minimize the possibility of cross-talk between non-selected waveguides in the transmit and receive arrays. The possibility of "hits" during switching between channels can be eliminated, and is controlled by dictating the process or switching steps used to rotate the biaxially-symmetric signal redirection element.

14 Claims, 14 Drawing Sheets

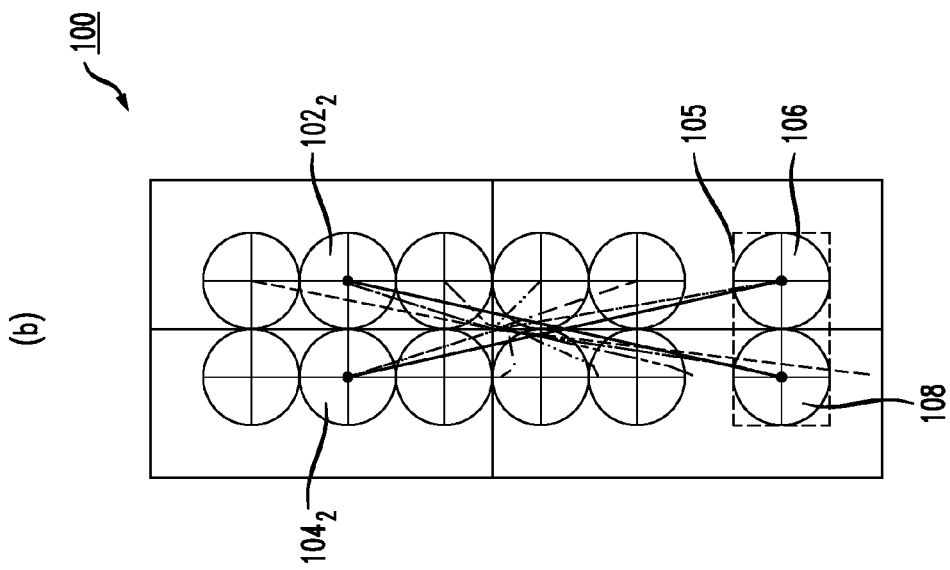
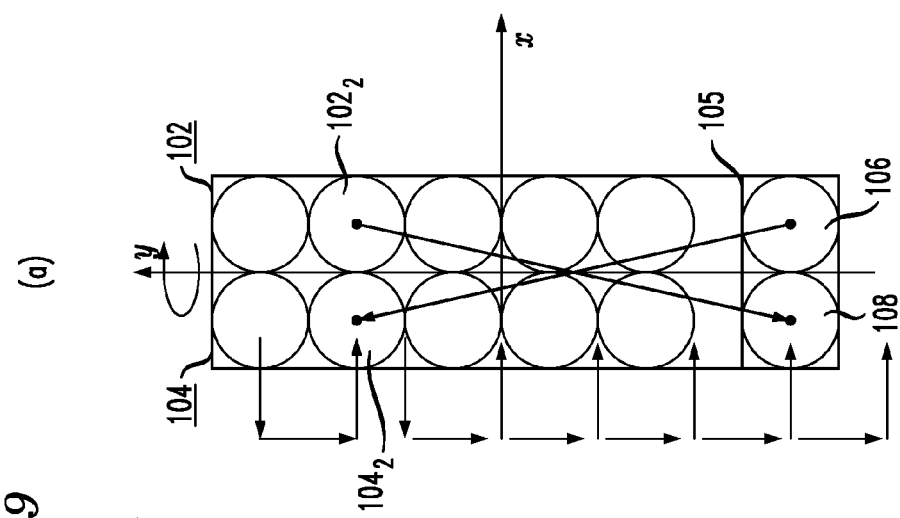
FIG. 19

DUAL-GANGED OPTICAL SWITCH

TECHNICAL FIELD

The present invention relates to an optical switch for selecting a designated transmitter/receiver pair of fibers from an array of possible alternatives.

BACKGROUND OF THE INVENTION

Transparent optical switching networks are being deployed to direct optical data signals without the need to perform transformation into the electrical domain. In most cases, these switches utilize a beam deflection element to provide the signal redirection, with micro-electro-mechanical-systems (MEMS)-based mirrors being one preferred alternative. Other types of beam deflecting arrangements include planar lightwave circuits (PLCs) which employ Mach Zehnder waveguides and thermal optic switches, digital micro-mirror devices (DMD), or liquid crystals (e.g., liquid crystal on silicon (LCOS)). These switching elements have been used for wavelength-selective switching throughout various communication networks, and are referred to at times as "select and route devices". Typically these wavelength selective switches are 1×N switches, where N=9, but have been scaled up to 23 ports or higher. Nevertheless, the scale of the switching matrix is inadequate to handle the routing needs of the ever-expanding internet.

To enable a larger switching matrix, M×N wavelength selective switches have been envisioned, but have not been realized due to their complexity. However, new M×N "multicast" optical switches (MSC) have been proposed, which are easier to implement, but usually require amplification to enhance their reach due to the broadcasting nature of the switch. A multicast optical switch is configured such that the input multiplexed signals (or channels) are split into copies and each copy is sent (or "cast") to several possible detection systems (i.e., broadcasting), where a particular copy and channel to be detected is selected from the multitude of different signals by a switch of some type (e.g., PLC- or MEMS-based switch). In addition, unique output signals or channels from individual transponders or sources are generated and directed by a similar switch to an output combiner, or multiplexed out. Thus, this switching architecture is referred to as a "broadcast and select" routing system.

MCS implemented with PLC technology (e.g., Mach Zehnder interferometers and thermo optic switching) are advantageous since in mass production their cost can be minimized by using batch processing inherent in wafer-based fabrication. The disadvantage of this approach is that the production volumes need to be high to sustain the expensive costs of a fabrication facility, and a new or different M×N MCS switching architecture requires a new set of masks and process runs. Thus, it becomes difficult to pay as you go since PLC it is not a modular approach that can be easily scaled with the increase in switching complexity. PLC MCS also has higher polarization dispersion loss (PDL) than other switching methods, usually higher loss, and other peculiarities (e.g. operational parameters are sensitive to processing parameters used for the wafer and change from batch to batch). Furthermore, the PLC arrayed switch on a section of a wafer is not small and requires a larger hermetic package, heaters, thus more input power and power dissipation schemes. The PLC chip also requires for input and output fiber v-grooves to be aligned and bonded to the chip, further increasing the complexity of the package. As such, packaging is a major cost issue for PLC MCS. Nevertheless, PLCs are widely utilized for low cost 1×N splitters or combiners, but this is a much simpler (and passive) implementation of the technology as compared to MCS.

On the other hand, MEMS-based switches allow a modular pay as you go approach for the construction of an M×N MCS, and may be readily constructed into any M×N configuration. The MEMS switch is relatively simple to package in small hermetic modules (e.g., approximately 7 mm diameter×20 mm long tubes) using only a 1×N fiber array, lens, and MEMS mirror mounted on a header enabling electrical control of the mirror. Of course, MEMS is also a wafer-based fabrication process, but MEMS mirrors are much more ubiquitous than a PLC based MCS and so the volume of MEMS mirrors are leveraged off many different applications. In addition, a 1×N MEMS switch has lower loss and PDL than PLC switches. Nevertheless, for an M×N MEMS-based MCS, the configuration requires the use of a plurality of M 1×N MEMS switches, one for each transmit set of ports and one for each receive set of ports; thus, the cost per switch must be low.

As the switch fabric density continue to increase, it is important that the switches (particularly the MEMS-based switches) operate accurately and efficiently with low loss, high directivity, high isolation and are hitless. In particular, if received optical signals experience a large degree of insertion loss (i.e., low coupling efficiency), they cannot be reliably detected in the presence of noise and other background effects. In many cases, this requires the addition of an amplifier—which increases the cost of the system, an undesirable result. Additionally, as the switch density increases, problems with "cross-talk" also increase, in terms of unwanted signals being coupled into designated signal paths. Thus, improving isolation between multiple signals is also an important goal. Furthermore, the directivity of the coupling must also be high, and the switching event must be hitless. Given the market conditions, it is also important to develop a cost-effective solution that is scalable with the number of connections.

SUMMARY OF THE INVENTION

The needs remaining in the prior art (such as low cost, low loss, low PDL, high isolation and directivity, as well as a scalable MCS) are addressed by the present invention, which relates to an optical switch for selecting a designated transmitter/receiver pair of fibers from an array of possible alternatives.

In particular, the present invention relates to the utilization of a "dual-ganged" switch geometry to provide for the simultaneous switching of a selected transmit/receive pair of optical signal paths (i.e., a given optical "channel" pair) between a specific optical communication device (such as a transponder or transceiver) and an optical communication network. More particularly, the ability to provide the simultaneous switching of both the transmit and receive fibers forming a channel pair (defined as a "dual-ganged" type of switching action) is based upon the use of a signal path configuration where the relative x-y position of the paths forming each channel pair, as well as the signal paths forming the device's communication port, is the same. A signal redirection element (such as a combination of a MEMS mirror and a lens), is used to direct the signals between the selected channel and the optical communication device. Previous arrangements known in the art do not perform this switching in any type of "ganged" (or coupled) configuration. The term "relative x-y position" is considered to describe various particular geometries. For example, if the signal paths of the communication device port are located "side by side" with a gap of 2 μm between them, the pairs of signal paths forming each "channel" pair are similar disposed "side by side" with the same gap spacing. If the signal paths of the device port are located on a diagonal, the same diagonal is required for each channel pair.

An additional aspect of the present invention relates to a specific waveguide (e.g., fiber) topology within a dual-ganged switch (DGS) that breaks the symmetry between the network transmit/receive signal paths and a pair of transmit and receive signal paths (also referred to as a "common port") associated with the communication device. By introducing an additional spacing between the collection of the transmit and receive signal paths and the common port, the dual-ganged switching functionality of the present invention enables high directivity of the coupling connection between the selected transmit/receive channel and the common port, while also providing high isolation and "hitless" switching between channels (as will be described in detail below).

In one specific embodiment, the transmit signal paths may be configured as a 1×N array, with the receive signal paths disposed in a similar arrangement such that the combination forms a 2×N array. The 2×N transmit/receive fiber array itself may be formed to include a defined gap between adjacent fibers, providing high isolation between the desired channel connection and all of the remaining non-selected signal paths. Indeed, the utilization of inter-fiber gaps with the symmetry-breaking configuration is one possible configuration for providing high directivity and hitless switching. As will be discussed in detail below, a series of calibration steps may be used in conjunction with this arrangement to further improve the hitless operation (both in open loop operation, or a combination of an open loop and closed loop control).

In one embodiment, a dual-ganged switch geometry of the present invention may be used to form a multicast optical switch, which again allows for the simultaneous switching between selected channels and common ports. The ability to provide such a Synchronous Multicast Switch (SMS) reduces by 50% the number of individual switches utilized to realize the prior art MCS (i.e., prior art devices that use separate 1×N arrays). Thus, the cost of the sum of the switching elements is reduced by two, and the overall size of the SMS is reduced and provides an improved product in terms of improved reliability (i.e., less components that may malfunction).

A particular exemplary embodiment of the present invention may be defined as dual-ganged optical switch for simultaneous switching of a paired grouping of a transmit signal path and a receive signal path with respect to common ports, with the dual-ganged optical switch comprising the following elements: (1) an optical waveguiding structure including a plurality of N receive optical signal paths and a plurality of N transmit receive optical signal paths (with a selected pair of receive and transmit signal paths defining an optical channel) and a device "common port" including a device transmit signal path and a device receive signal path, with the relative x-y position of the paths forming the common port replicated in each pair of signal paths forming an optical channel; (2) an optical signal redirection element (in some embodiments, a biaxially-symmetric redirection element) disposed to couple optical signals between a selected optical channel and the device common port such that an optical signal propagating along the receive optical signal path of the selected optical channel is redirected in the device receive signal path of the common port and an optical signal exiting the common port along the device transmit signal path is redirected into the transmit signal path of the selected optical channel; and (3) a collimating lens disposed in an optical signal path between the optical waveguiding structure and the optical signal redirection element. Accordingly, dual-ganged switching between optical channels coupled to the common port is controlled by reorienting the optical signal redirection element so as to change the selected pair of signal paths that intercept the redirection element to then maintain coupling with the device common ports.

Another particular exemplary embodiment of the present invention may be characterized as a method of providing switching between channels of a dual-ganged optical switch (the switch as defined above), where the method including the steps of: (1) upon receiving a control message to switch communication with the common port from a first channel to a second channel, rotating the biaxially-symmetric signal redirection element with respect to the optical system y-axis to translate optical signal origination and termination locations along an x-axis direction of the optical system to a position beyond the array structure; (2) rotating the biaxially-symmetric signal redirection element with respect to the optical system x-axis to translate optical signal origination and termination locations along the y-axis direction by an amount associated with the physical separation between the first and second channels; and (3) rotating the biaxially-symmetric signal redirection element with respect to the optical system y-axis to translation optical signal original and termination locations along the x-axis direction to align the selected second channel receive and transmit optical signal paths with the device common port.

Other and further aspects and embodiments of the present invention will become apparent during the course of the following discussion and by reference to the accompanying drawings.

BRIEF DESCRIPTION OF THE DRAWINGS

Referring now to the drawings, where like numerals represent like parts in several views:

FIGS. 17-19 illustrate an exemplary three-step process for providing "hitless" switching in accordance with the present invention, where FIG. 17 illustrates a first "y-axis" rotation step for re-orienting a signal redirection element, FIG. 18 illustrates an "x-axis" rotation step for the signal redirection element, and FIG. 19 illustrates a second (final) "y-axis" rotation step;

DETAILED DESCRIPTION

Figure 1:
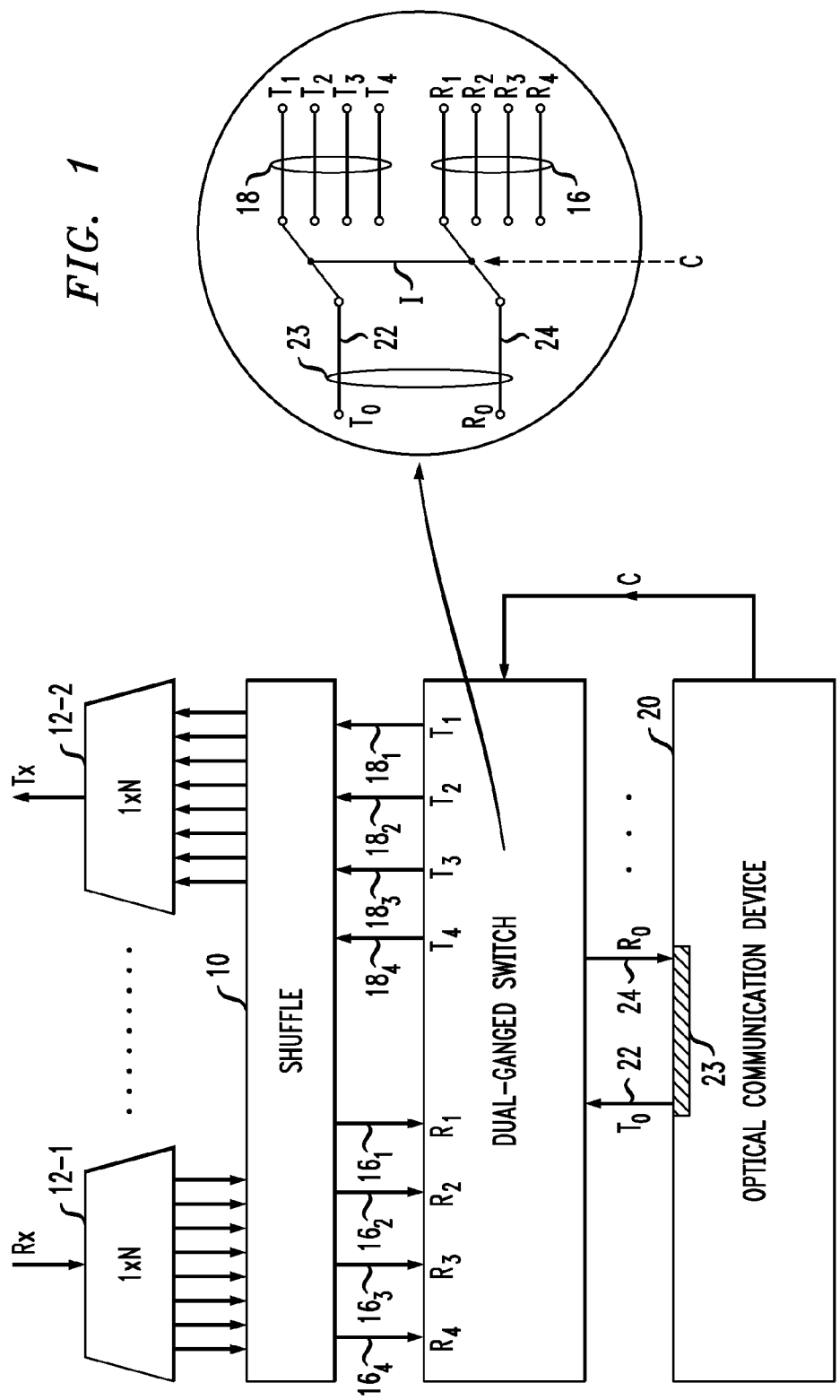
FIG. 1 illustrates a portion of an exemplary optical network architecture within which a dual-ganged optical switch formed in accordance with the present invention may be deployed.

In optical communication networks, a specific transmit wavelength and a specific (possibly different) receive wavelength are utilized to form a transmit/receive "channel" pair. One function of an optical switching node is to control the specific channel that is selected to communicate with a predetermined optical communication device (such as a transponder or transceiver) and the remainder of the optical network. When it is desired to change ("switch") from one spectral channel to another, the optical switching node changes both the associated optical transmit wavelength and the associated optical receive wavelength. More particularly, an exemplary optical switching node simultaneously changes the selected pair of optical waveguides (typically, fibers) from the network's transmit/receive waveguide arrays (typically, fiber arrays) that are to be coupled to the optical transmit and receive waveguides (e.g., fibers) associated with the communication device. For the sake of clarity, the remainder of this document will use the term "fiber" in describing an optical signal path coupled between two communication elements. It is to be understood that various other types of waveguiding media may be used, such as planar waveguides (planar lightwave circuits, or PLCs), silicon-based integrated waveguides, or the like. All are considered to fall within the scope of the present invention.

Given the need to simultaneously change both the transmit and receive fibers selected from the network array of fibers, it has been realized that a "dual-ganged" switching mechanism, as described below, is an efficient configuration for providing this type of "paired" switching, using only half of the individual switching elements as found in conventional arrangements based on using a 1×N array of fibers associated with the transmit paths and a separate 1×N array of fibers associated with the receive paths.

As will be described in detail below, the ability to provide dual-ganged switching in accordance with the present invention also provides improved design features in terms of providing high directivity, low cross-talk (high isolation), and "hitless" operation. High directivity is achieved when utilizing a signal path configuration that exhibits symmetry breaking between the transmit/receive fiber configuration and the common port of an associated optical communication device. In an embodiment where the transmit/receive fibers are configured as a 2×N array, the latter two features (isolation and directivity) are enabled by incorporating gaps between adjacent fibers in the 2×N array, pitch breaking of array symmetry, and utilizing a controlled steering process when switching from one optical channel to another. Without the inter-fiber gaps, switching between pairs of fibers may cause light to couple into the cladding region of an adjacent fiber, which has the possibility of scattering into the core region of the adjacent fiber. This unwanted coupling becomes an isolation problem, creating a "hit" (i.e., unwanted signal propagation) when switching along some of the fibers in the array.

FIG. 1 illustrates a portion of an exemplary optical network architecture within which a dual-ganged optical switch formed in accordance with the present invention may be deployed. Shown in FIG. 1 is a network element 10 that is used as part of a communication network to redirect optical signals between various nodes, such as an optical communication device 20 (which may be an optical transponder, transceiver, or any other type of element utilized within an optical communication network) and various other end-user communication devices not shown.

A plurality of 1×N optical wavelength division multiplexers (WDMs) 12 is used to input/output optical signals to/from network element 10. A first WDM $12_1$ is shown as responsive to a multiplexed received signal $R_x$ which is thereafter demultiplexed into a set of separate "receive" signals, each operating at a different wavelength and applied as a different input to network element 10. Another WDM $12_x$ is shown as responsive to a plurality of N transmitted output signals from network element 10 (each operating at a different wavelength) which are then combined to create a (multiplexed) output signal $T_x$ which is thereafter transmitted toward other elements in the optical communications network (not shown).

As also shown in the exemplary arrangement of FIG. 1, a set of four received signals, designated $R_1$, $R_2$, $R_3$ and $R_4$ are provided as outputs from network element 10 and are applied as separate inputs to a dual-ganged optical switch (DGS) 14 formed in accordance with the present invention, which operates as an optical switching node in the manner described above. In one exemplary embodiment, these four signals are provided along a 1×4 array 16 of optical fibers $16_1$, $16_2$, $16_3$ and $16_4$ (hereinafter referred to as "receive fiber array" 16). A similar 1×4 fiber array 18 is shown in FIG. 1 as coupled between DGS 14 and network element 10, and is used to introduce a set of four separate transmit signals into the communication network (hereinafter referred to as "transmit fiber array" 18). As shown, transmit fiber array 18 includes individual fibers $18_1$, $18_2$, $18_3$ and $18_4$, each capable of supporting the propagation of a different transmitted optical data signal (each operating at a different wavelength) from node 14 into the communication network. When paired together, a specific receive fiber (such as fiber $16_2$) and a specific transmit fiber (such as fiber $18_2$) are considered to define an optical channel (e.g., "channel 2" in this case). The switching properties of DGS 14 will be described below.

Continuing with the description of FIG. 1, optical communication device 20 is shown as coupled to DGS 14 via a pair of optical signal paths (e.g., fibers), shown as device transmit fiber 22 and device receive fiber 24, hereinafter also referred to as a device common port 23. In operation, optical communication device 20 provides a control signal C to DGS 14 to select a specific "channel" (i.e., a specific pair of fibers from arrays 16 and 18) for use by optical communication device 20, via common port 23, to communicate with the other elements in the network. A simplified diagram illustrating the operational characteristic of a dual-gang switch as it is used to provide this channel selection is also shown in FIG. 1.

In this diagram, the signal path $T_0$ corresponds to device transmit fiber 22 of optical communication device 20 and signal path $R_0$ corresponds to device receive fiber 24 of optical communication device 20, collectively defining device common port 23. Similarly, the set of signal paths $T_1$, $T_2$, $T_3$ and $T_4$ correspond to transmit array fibers $18_1$, $18_2$, $18_3$ and $18_4$, respectively, and the set of signal paths $R_1$, $R_2$, $R_3$ and $R_4$ correspond to receive array fibers $16_1$, $16_2$, $16_3$ and $16_4$. As mentioned above, the conventional operation of an optical switching node requires the simultaneous switching of both a given "receive" signal path and "transmit" signal path. Thus, the switching is "dual" in the sense that switching of both the transmit and receive signal paths is performed. Additionally, the pairing of specific transmit and receive wavelengths remains constant in an optical communications network, meaning that when it is desired to switch to a specific "transmit" wavelength, the associated "receive" wavelength must also be utilized. Both paths are also required to be switched at the same time (i.e., synchronous switching), Thus, the improved functionality of the inventive switch is provided by coupling (or "ganging") the switching of the transmit path and the receive path, as depicted by interconnection I in the diagram portion of FIG. 1. With this understanding of the dual-ganged operation of DGS 14, it is clear that the application of a control signal C to DGS 14 can be used to direct the proper pair of transmit/receive signals (from arrays 16 and 18) to common port 23 of optical communication device 20.

Figure 2:
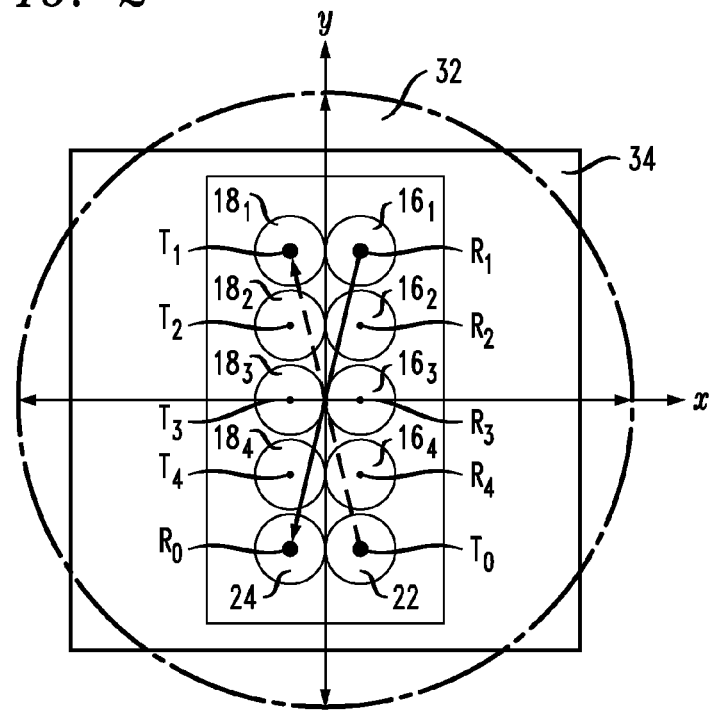
FIG. 2 is a front view of portions of an exemplary dual-ganged switch that function to provide switching within an optical fiber array structure.
Figure 3:
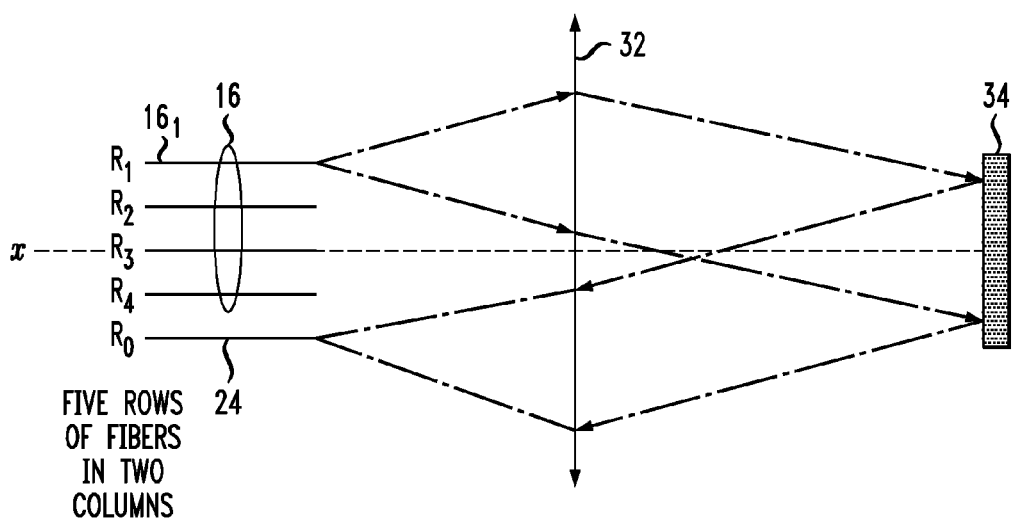
FIG. 3 is a side view of portions of an exemplary dual-ganged switch that function to provide switching within an optical fiber array structure.

In accordance with the present invention, it has been determined that this type of dual-ganged switching can be effected in an optical switching node by using a signal redirection element (such as a MEMS mirror and lens combination) in association with a predetermined waveguide structure including both the network-based transmit/receive signal path pairs (forming the plurality of separate channels) and the device-based pair of waveguides forming the communication port. As mentioned above, dual-ganged switching will be provided as long as the relative x-y position of the pair of signal paths forming the port is also used in constructing the network-based transmit/receive configuration (e.g., "side-by-side", on a diagonal, etc.). FIGS. 2 and 3 illustrate a front view and side view, respectively, of portions of an exemplary DGS 14 that functions to provide dual-ganged switching within such a waveguide structure, using in this configuration a biaxially-symmetric signal redirection element with a "side by side" configuration of the signal paths, thus providing the desired signal connection between device common port 23 (i.e., fibers 22, 24) and fiber arrays 16, 18.

In the front view of FIG. 2, a fiber array structure 30 is shown as housing a two dimensional fiber array configuration consisting of 1×N receive fiber array 16 (aligned along the y-axis as shown), 1×N transmit fiber array 18 (adjacent to receiver fiber array 16 and also aligned along the y-axis), device transmit fiber 22 (disposed below and aligned with receive fiber array 16) and device receive fiber 24 (disposed below and aligned with transmit fiber array 18). An end view of a collimating lens 32 and a biaxially-symmetric mirror 34 is also shown in this view. In accordance with the present invention, and as will be described below, the combination of collimating lens 23 and biaxially-symmetric mirror 34 forms a biaxially-symmetric signal redirection element that is able to provide the desired dual-ganged switching functionality, controlling the coupling between a specific pair of array fibers $16_i$, $18_i$ and device common port 23.

A signal redirection element is considered to exhibit "biaxial symmetry" for the purposes of the present invention when a signal received within one quadrant of the array configuration is re-directed into an oppositely-located signal path within the diagonally-located quadrant. Said another way, a biaxial signal redirection element exhibits both "top-bottom" symmetry and "left-right" symmetry" with respect to the x and y axes of the optical system. With reference to FIG. 2, the utilization of a signal redirection element with biaxial symmetry means that an optical signal received at array fiber $16_1$ is redirected into device receive fiber 24 (top signal port in quadrant I redirected into bottom signal port in quadrant III). Similarly, the transmitted output signal appearing along device transmit fiber 22 will be coupled into transmit array fiber $18_1$ (bottom port in quadrant IV redirected to top port in quadrant II).

In many optical switching components, the combination of a MEMS mirror and a lens is used as the signal redirection element, with an applied electrical signal utilized to control the positioning of the micromirror forming the MEMS device. Indeed, a MEMS device is well-suited for use in the arrangement of the present invention, since it exhibits, when paired with a lens, the desired biaxially symmetric property. The side view of DGS 14 as shown in FIG. 3 includes an exemplary biaxial MEMS device 34, as used in combination with collimating lens 32 and fiber array structure 30. The operation of MEMS device 34 to perform the signal redirection is shown by ray tracing, with a received optical signal exiting receive array fiber $16_1$ passing through collimating lens 32 and impinging MEMS device 34. By virtue of the biaxial symmetry property as described above, the collimated version of the received signal will be reflected by MEMS device 34 such that the signal is redirected into receive optical fiber 24 (after passing a second time through lens 32, which functions in this direction to focus the received signal into the core region of optical fiber 24). It is to be understood that receive optical 24 is actually not in the same plane as receive fiber array 16 (see FIG. 2), but is located in alignment with transmit fiber array 18, where the biaxial symmetry property redirects the signal from quadrant I of the array structure into quadrant III of the array structure. Moreover, it is understood that while various embodiments of the present invention as described below utilize a MEMS device as the redirection element, other suitable devices may be used, including, for example, a liquid-crystal-based switching element, a piezoelectric-based switching element, acousto-electric element, LCOS, or any other suitable arrangement that provides the necessary biaxial symmetry in performing the switching function.

For the specific position of DGS 14 described thus far, the array signal pair $T_1/R_1$ will be coupled to device common port 23 (i.e., fiber pair $16_1$, $18_1$ will be coupled to fibers 24 and 22, respectively). When it is desired to change the array pair coupled to a specific optical communication device (i.e., change the optical "channel" associated with the optical communication device), a control signal C is sent from optical communication device 20 to DGS 14. In accordance with the operation of the inventive dual-ganged switch as described above in combination with the biaxial symmetry property of MEMS device 34 and lens 32, this control signal C is used to rotate MEMS device 34 about the x- and y-axes of the optical system such that a different transmit/receive array signal pair is directed into device common port 23.

Figure 4:
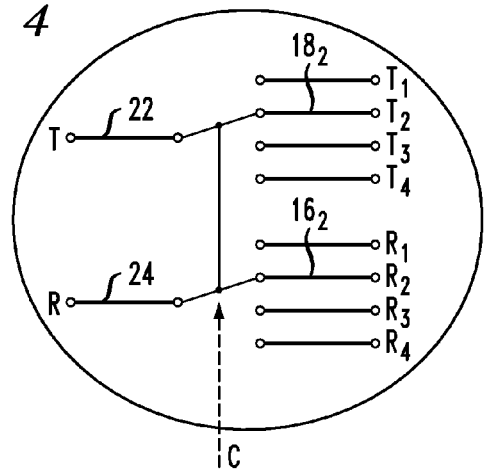
FIG. 4 is a schematic diagram illustrating the use of control signal C to switch the position of a dual-ganged switch to change the transmit/receive signal pair coupled to an optical communication device.
Figure 5:
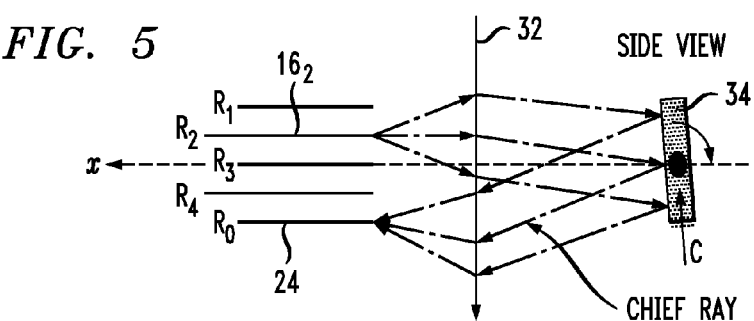
FIG. 5 is a side view of a ray diagram tracing the light beams through a fiber array providing the switching action of FIG. 4.
Figure 6:
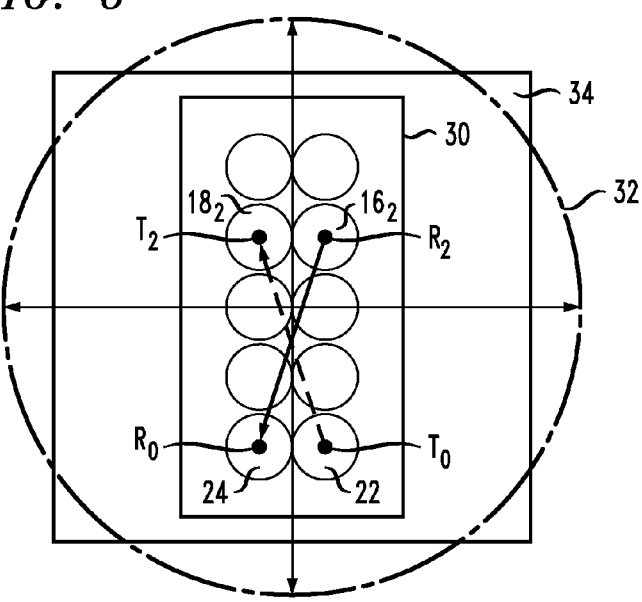
FIG. 6 is an end-view of an exemplary fiber array structure, illustrating this change in switch position as associated with FIGS. 4 and 5.

FIG. 4 is a schematic diagram illustrating the use of control signal C to switch the position of DGS 14 to now couple array signal pair $T_2/R_2$ to device common port 23 (signal pair $T_0/R_0$). This switching is performed in one exemplary embodiment of the present invention as shown in FIG. 5, by re-orienting MEMS device 34 to change the optical redirection properties of the system such that the optical signal exiting along array signal path $R_2$ is redirected into device receive signal port $R_0$. Although not visible in this side view, it is to be understood that by virtue of using the dual-ganged switching functionality of the present invention, the transmit optical signal from device 20 that is propagating along device transmit fiber 22 is simultaneously redirected into transmit array fiber $18_2$. FIG. 6 is a front view of fiber array structure 30 illustrating this change in signal pairing, with the received optical data signal $R_2$ exiting receive array fiber $16_2$ being coupled into device receive fiber 24 and transmitted optical data signal $T_0$ now directed into receive array fiber $16_2$.

The utilization of a dual-ganged optical switch in the manner described above is considered to provide substantial improvement over prior art switching systems used in conventional optical switching nodes. In particular and as described in more detail below, the number of individual switching elements is reduced by 50% when compared to conventional prior art arrangements that separately controlled 1×N transmit and receive fiber arrays, as a result of the "dual switching" aspect (i.e. combining the transmit and receive switching operations within the same switching element). Additionally, inasmuch as the simultaneous switching of the transmit and receive paths in the arrangement of the present invention is based upon using the same relative x-y positioning for both the port signal paths and the plurality of signal paths forming each transmit/receive pair defining an optical channel. In combination with a signal redirection device, the topology of maintaining the same relative x-y positions eliminates the need for additional components to ensure that both paths are switched at the same time.

Figure 7:
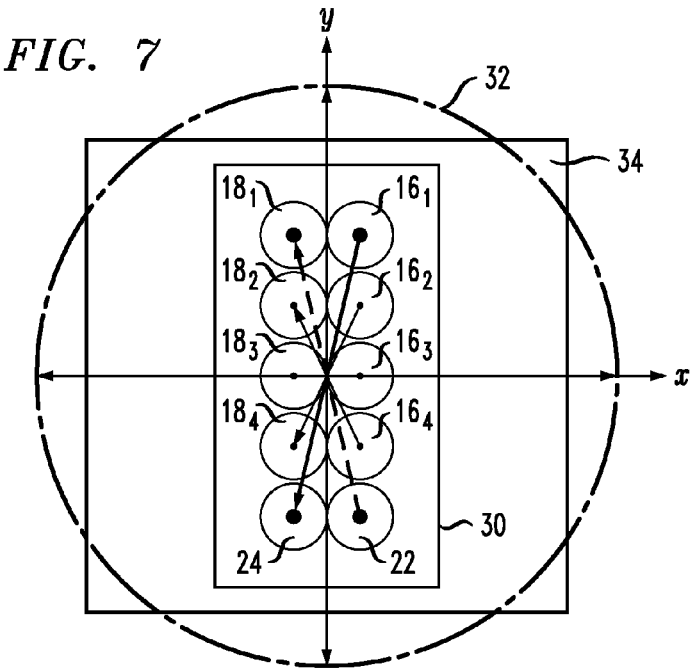
FIG. 7 is an illustration of the same end-view as shown in FIG. 6, in this case illustrating the possibility of unwanted return loss associated with the coupling of non-selected signals into the transmit fiber array.

While useful in providing the desired switching function, arrangements such as described thus far may exhibit problems in terms of signal isolation and optical cross talk. These conditions are best understood by reference to FIG. 7, which again illustrates a front view of the combination of fiber array structure 30, collimating lens 32 and MEMS mirror 34. In this view, the system is oriented such that array fibers $16_1$ and $18_1$ are coupled to device common port 23 (i.e., device fibers 24 and 22, respectively). As a result of the biaxial symmetry properties of the beam redirection element (the combination of lens 32 and MEMS mirror 34), this orientation of the beam redirection element also results in unwanted coupling of optical signals between non-selected signal paths. In particular and as shown in FIG. 7, the optical signal $R_2$ exiting receive array fiber $16_2$ will be coupled into transmit array fiber $18_4$, optical signal $R_3$ exiting receive array fiber $16_3$ will be coupled into transmit array fiber $18_3$, and optical signal $R_4$ exiting receive array fiber $16_4$ will be coupled into transmit fiber array $18_2$. All of these interconnections are undesirable and may result in an unacceptable amount of cross-talk being introduced into the optical system (i.e., presenting potential problems associated with signal directivity and high return loss).

Figure 8:
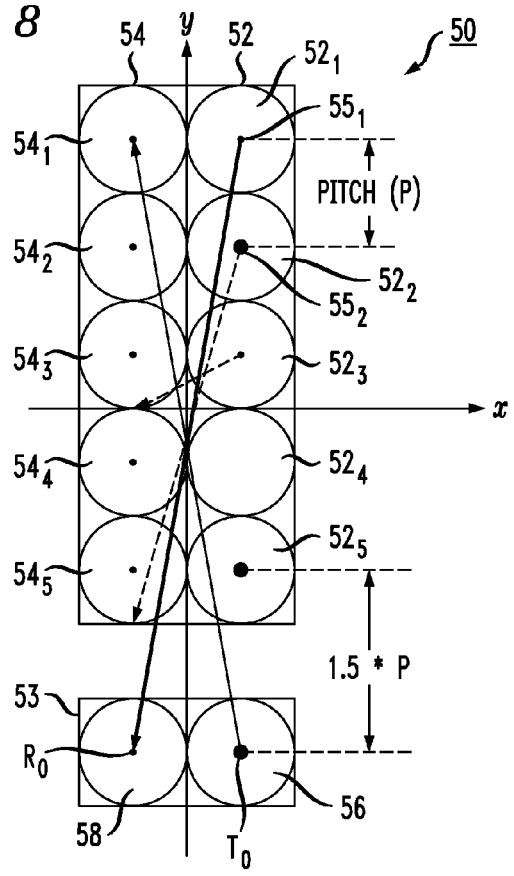
FIG. 8 is an end-view of an exemplary fiber array structure formed in accordance with the present invention to include a "break" in the symmetry between the network transmit/receive fiber arrays and the pair of the transmit/receive optical communication device fibers, where this break in symmetry reduces the amount of unwanted coupling between the receive and transmit fiber arrays.

These problems are addressed in accordance with another embodiment of the present invention, where the fiber array structure is modified to break the symmetry of within the configuration of the fibers such that the unwanted coupling between the receive and transmit array fibers is substantially reduced. FIG. 8 illustrates an exemplary fiber array structure 50 that exhibits this break in symmetry. As shown, a receive fiber array 52 and a transmit fiber array 54 are contained within fiber array structure 50 and are disposed in the same configuration as with the embodiments discussed above. However, the symmetry within the configuration is broken in this embodiment by shifting the location of a device common port 53 (comprising a transmit fiber 56 and a device receive fiber 58) with respect to arrays 52 and 54.

In particular, device common port 53 associated with an optical communication device (not shown) is displaced downward along the y-axis by an amount equal to 1.5*P, where "P" is defined as the pitch of the network fiber arrays. The pitch is illustrated in FIG. 8 as the spacing between adjacent core regions $55_1$ and $55_2$ of receive array fibers $52_1$ and $52_2$. In accordance with the present invention, a spacing of 1.5P is used between the last fibers in the array (here, $52_5$ and $54_5$) and device fiber pair 56, 58. For a pitch of 80 µm (a typical value), a spacing of 120 µm is created between network arrays 52, 54 and device common port 53. It is to be understood that while a symmetry-breaking spacing of 1.5P is proposed, any other appropriate gap spacing may be used, with the orientation of the signal redirection element modified to compensate for the spacing and provide for the coupling of selected channel with the device common port.

Presuming that it is desired to couple array fiber pair $52_1$ and $54_1$ to device fibers 58 and 56, respectively, the accompanying biaxial signal redirection element is rotated until a maximum coupling between receive array fiber $52_1$ and device receive fiber 58 is achieved (i.e., lowest insertion loss). Said another way, the highest coupling is achieved when the overlap integral between the field of the propagating optical signal $R_1$ and the mode field diameter (MFD) of fiber 58 is maximized.

In accordance with this embodiment of the present invention and as evident in the view of FIG. 8, when the system is aligned such that maximum coupling is achieved between array fibers $52_1$, $54_1$ and device fibers 58, 56, the non-selected (unwanted) received optical signals $R_2$, $R_3$ and $R_4$ will not be coupled into the central portions of the fibers within transmit array 54, but instead will be directed to an outer cladding region of the fibers. This redirection is a result of breaking the symmetry in the location of the device fibers with respect to the array fibers in accordance with this embodiment of the present invention. As a result, the problems with cross-talk and return loss described above are substantially reduced, since the unwanted receive signals are no longer directly coupled into the fibers forming the transmit array.

As mentioned above, another consideration for optimum performance of an optical switch is isolation (i.e., "insertion loss") between the signals on the order of 50 dB (or greater). In this context, the issue of isolation is studied with respect to the unwanted receive signals coupling into the fibers forming the transmit array. The isolation associated with a dual-ganged switch formed in accordance with the present invention can be derived from an analysis of a separation between a receive optical beam and a transmit array fiber core. In one case, this analysis is accomplished by creating an overlap integral between the mode fields associated with the optical beam and the fiber core. When considering the case of the amount of coupling between a non-selected receive beam and a fiber along the transmit fiber array, the desired result is to have large insertion loss (i.e., a high degree of isolation between the beam and the core of the transmit array fiber).

Figure 9:
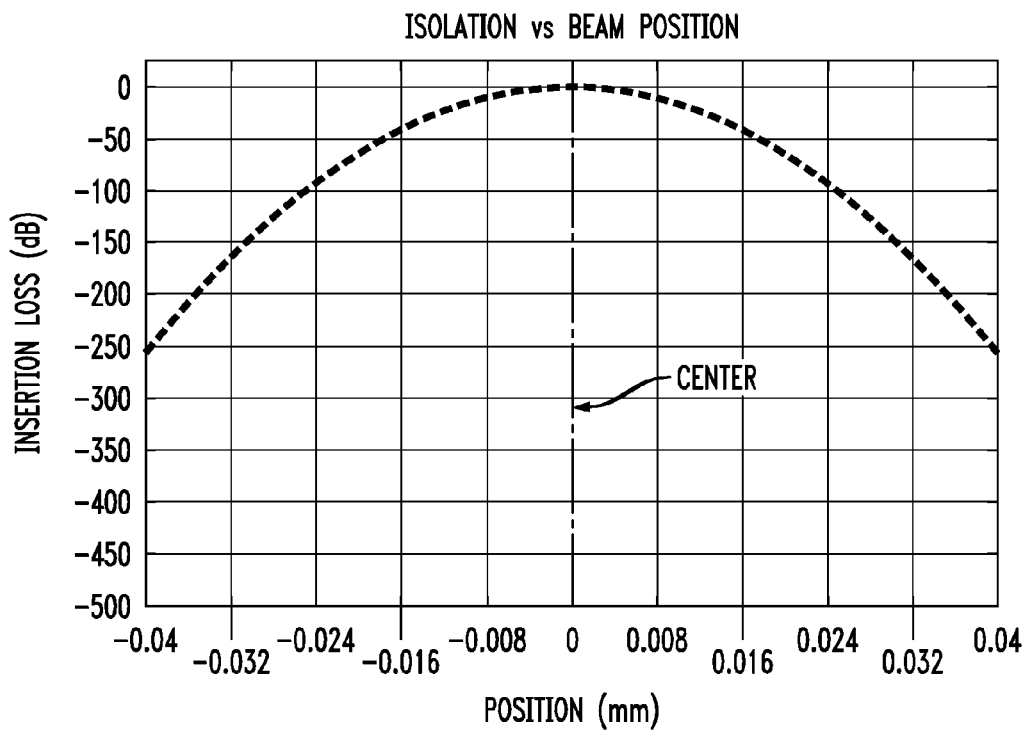
FIG. 9 is graph of insertion loss as a function of position across the diameter of an optical fiber.

FIG. 9 is a graph of insertion loss as a function of beam position in the ideal case, with the insertion loss and measured in dB and the position of the beam with respect to the center of the fiber's core measured in mm. In principle, is it shown that high isolation is achieved if the beam is more than 20 µm from center of the fiber core (presuming a fiber core having a diameter of 10.4 µm). Since the embodiments of the present invention where the symmetry between the array fibers and device fibers is broken results in the unwanted receive signals being directed toward the "edge" of the transmit fibers (i.e., beyond the 20 µm amount), it may be presumed that a sufficient amount of isolation is achieved. Isolation on the order of 50 dB is considered preferable for this switching arrangement.

Figure 10:
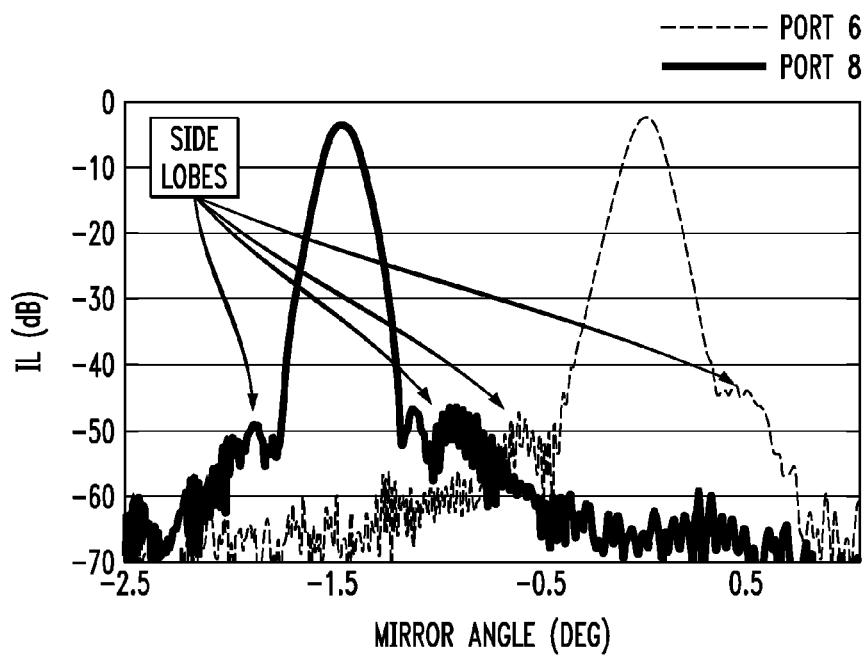
FIG. 10 is a plot of insertion loss for a pair of transmit array fibers, illustrating the presence of side lobes attributed to undesired signal coupling into transmit array fibers.

While this relationship is sufficient in principle, it has been found that light entering the cladding portion of a fiber will be somewhat scattered, with the possibility of injecting some light into the core, creating side lobes that are greater than −50 dB. This result is shown in FIG. 10, which shows relatively large side lobes (approaching approximately −40 dB) for two individual fibers as contained within a transmit fiber array. This unwanted, injected light may result in introducing unwanted cross-talk, or noise, in the return signal being transmitted to the optical network. Thus, in order to provide a high degree of isolation between the unwanted receive signals and the transmit fiber array, a fiber array configuration that includes gaps of a prescribed amount between adjacent fibers may be preferred.

Figure 11:
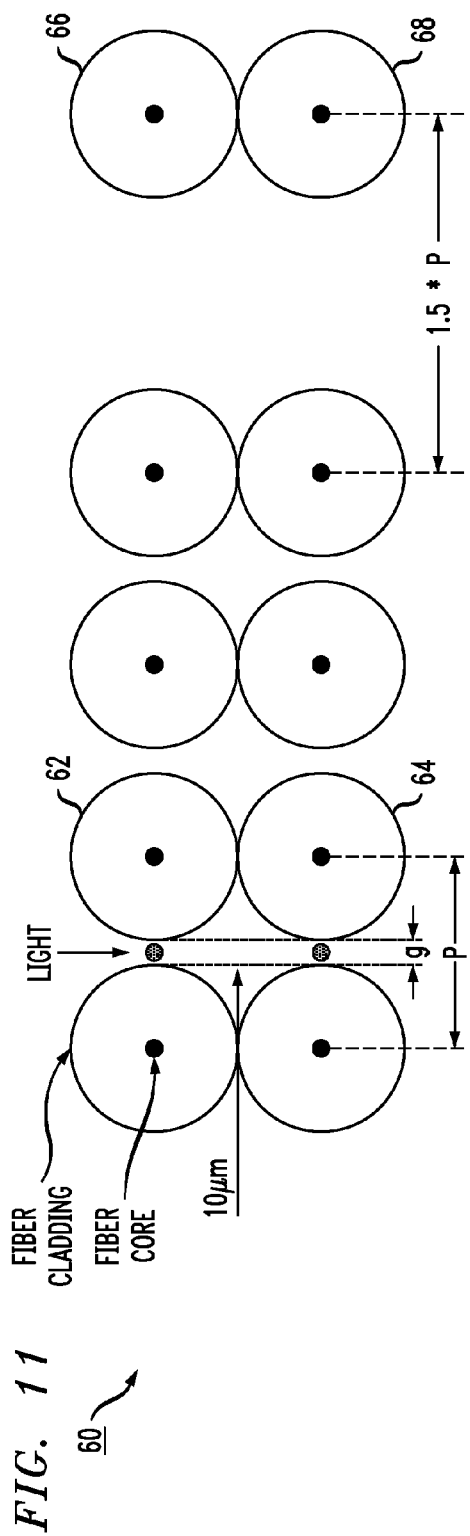
FIG. 11 is an end-view of another exemplary fiber array structure formed in accordance with the present invention that retains the break in symmetry, as shown in FIG. 8, while also introducing a spacing ("gap") between the individual fibers forming the array, where the non-selected signals will enter these gap regions instead of impinging the cladding area of the transmit array fibers.

FIG. 11 illustrates an exemplary fiber array structure 60 for use in a dual-ganged switch formed in accordance with the present invention, where a controlled gap g (in this case, a 10 µm gap) is included between adjacent fibers in a receive fiber array 62, as well as between adjacent fibers in a transmit fiber array 64, in order to achieve a high isolation result. In order to provide the desired break in symmetry between the arrays 62, 64 and a device port 65 consisting of a pair of device fibers 66 and 68, this extra gap dimension g is included in the calculation of the pitch, as well as the displacement of the fiber pair with respect to the array. As shown, by including a gap of sufficient dimension, the unwanted receive signals will now fall within this gap and no longer impinge the cladding layer of the transmit fibers in the array structure. As a result, the opportunity for any non-selected signal to be re-directed into a transmit fiber is essentially eliminated.

It is to be understood that including an inter-fiber gap within the array structure will result in modifying the y-axis and x-axis rotations of the biaxially-symmetric MEMS device in order to achieve the proper coupling (i.e., minimum insertion loss) between the selected transmit/receive signal pairs.

Figure 12:
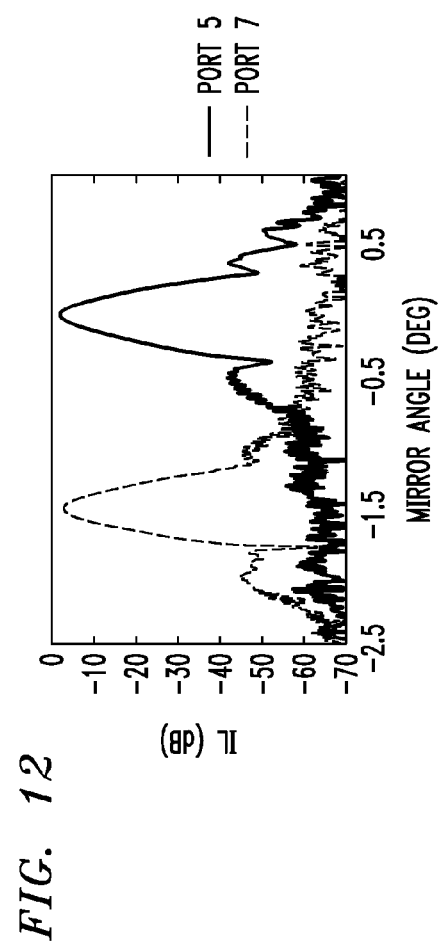
FIG. 12 is a plot of insertion loss associated with the arrangement of FIG. 11, illustrating the improvement in isolation achieved by including the gap spacing in the fiber array.

FIG. 12 is a graph illustrating an improvement in isolation when a "gapped" fiber array as shown in FIG. 11 in used. In comparing the results shown in FIG. 10 to those in FIG. 12, it is evident that the inclusion of this gap improves the insertion loss, where the side lobes in FIG. 12 are seen to approach a level of −60 dB.

While the configurations as described thus far have illustrated the ability of providing dual-ganged switching between a single 2×N transmit/receive fiber array configuration and a common port of an optical communication device, it is possible to expand the switching abilities to allow for multiple fiber arrays to communicate with a common port. This type of multi-array configuration is possible by virtue of using a biaxially-symmetric redirection element in accordance with the present invention.

Figure 13:
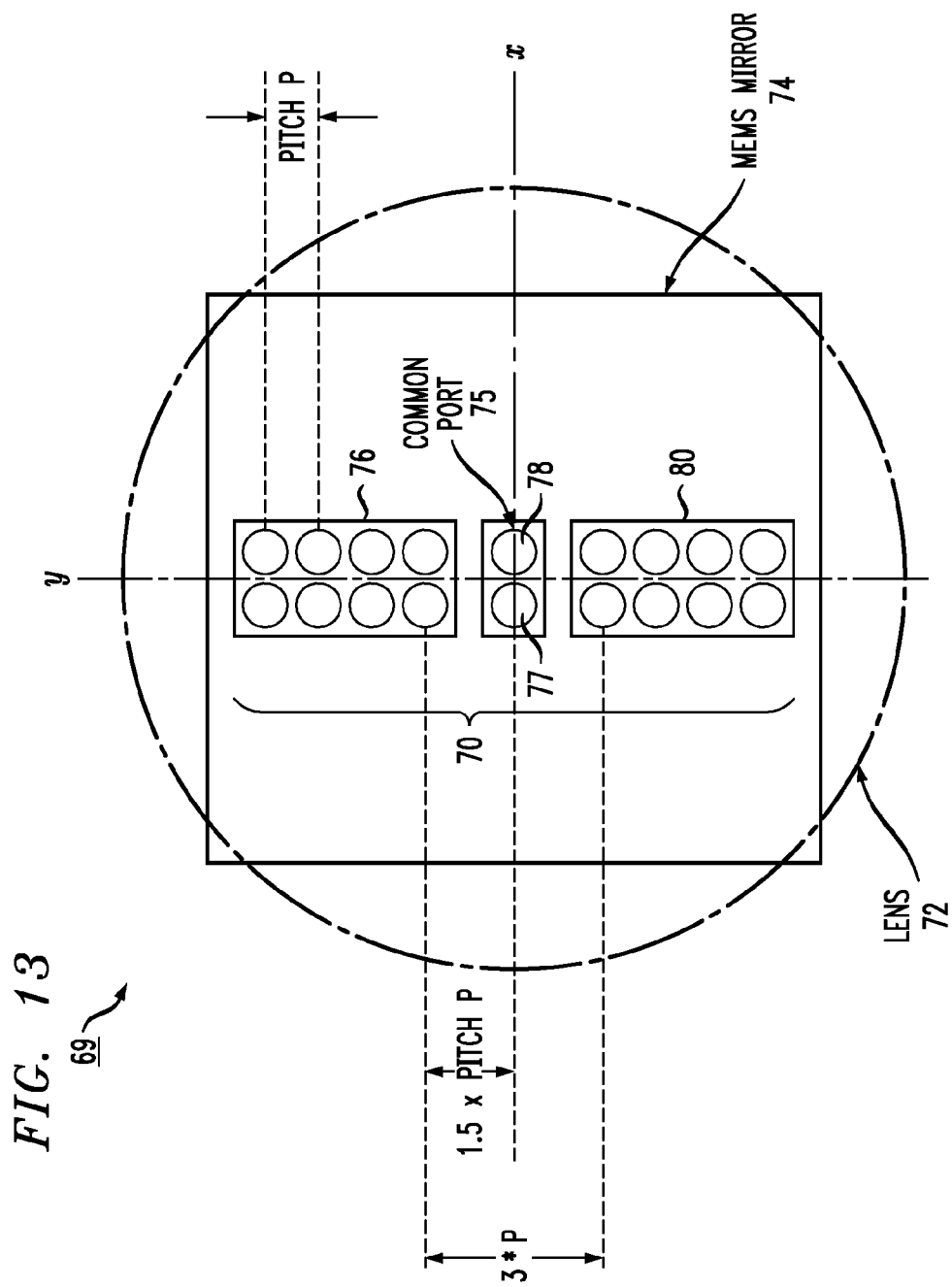
FIGS. 13-16 illustrate various alternative multi-array embodiments of the dual-ganged optical switch of the present invention.

FIG. 13 is a front view of an exemplary multi-array dual-ganged optical switch 69 formed in accordance with the present invention. As shown, multi-array DGS 69 includes a fiber array structure 70, a collimating lens 72 and a MEMS mirror 74. In this particular embodiment, fiber array structure 70 includes a 2×M transmit/receive fiber array 76, where 2×M array 76 functions in the manner similar to the various transmit/receive fiber arrays described above. In accordance with this particular embodiment of the present invention, fiber array structure further comprises a device common port 75, including a device optical receive fiber 77 and a device optical transmit fiber 78.

As shown, device common port 75 is disposed along the x-axis of the system; that is, common port 75 is centrally disposed within the arrangement. A separate transmit/receive array 80 (in this case, a 2×(M−N) array, where 1<M<N) is shown as disposed in alignment with transmit/receive array 76, but positioned along the y-axis below the location of common port 75. In order to maintain the desired coupling between a given optical channel (transmit, receive fiber pair) from either array 76 or array 79 with common port 75, it is to be understood that MEMS mirror 74 needs to be properly oriented so as to redirect the optical signals between the centralized port location 75 and the selected optical channel.

As also shown in FIG. 13, this particular embodiment utilizes a break in symmetry between device common port 75 and both transmit/receive fiber array 76 and transmit/receive fiber array 79. The pitch, P, between adjacent fibers is shown in association with transmit/receive fiber array 76. A symmetry-breaking spacing of 1.5×P is also shown between array 76 and common port 75. A similar symmetry-breaking spacing is included between common port 75 and transmit/receive array 79. In this configuration, therefore, the pair of transmit/receive fiber arrays are separated by a total spacing of 3×P.

Figure 14:
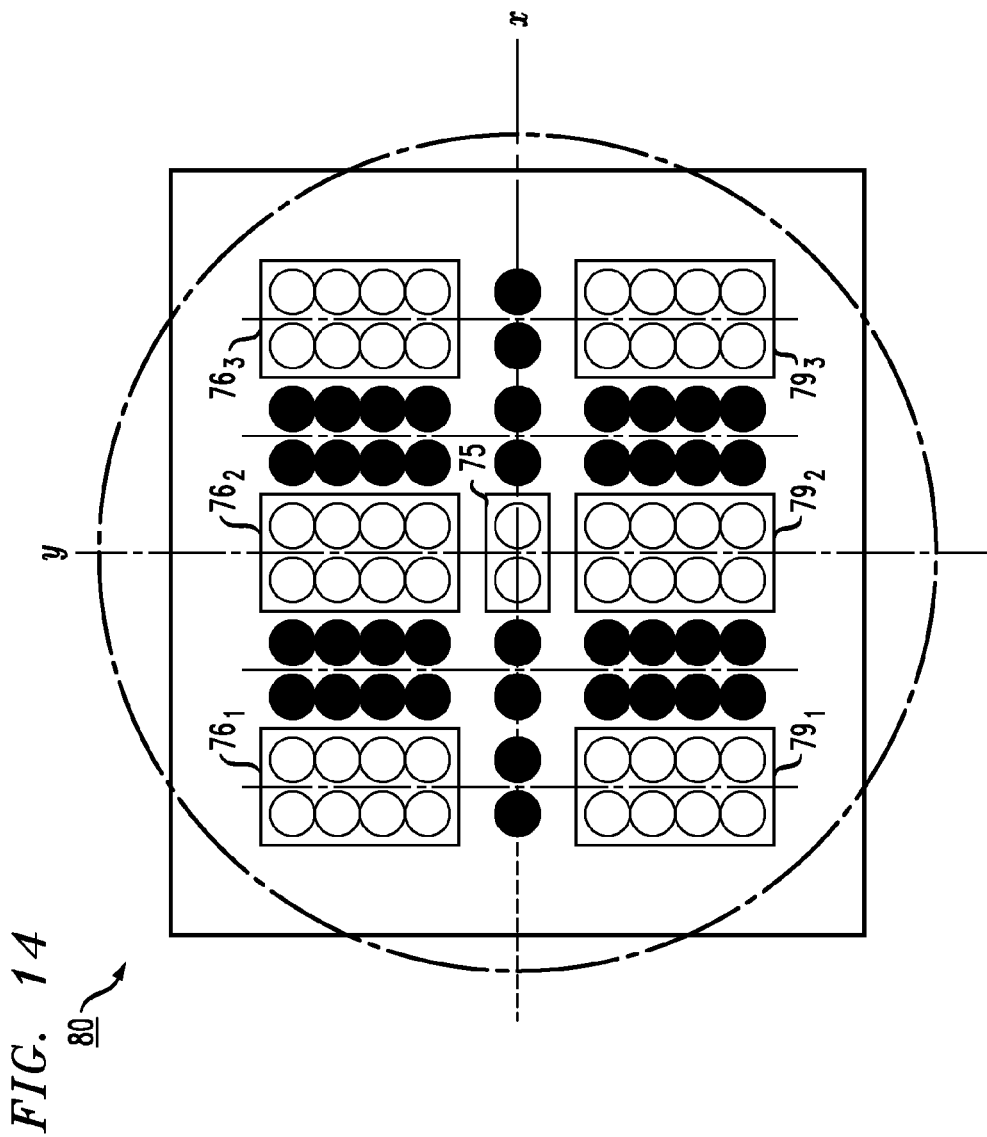

Clearly, the multiple array configuration as shown in FIG. 13 may be extended, where another embodiment is shown in FIG. 14. In this case, a multi-array dual-ganged switch 80 includes a first set of three fiber arrays $76_1$, $76_2$ and $76_3$ that are disposed above the x-axis of the configuration, and a second set of three fiber arrays $79_1$, $79_2$ and $79_3$ that are disposed below the x-axis, with device common port 75 again shown as located along the x-axis. In this embodiment, common port 75 is centered along the x-axis with respect to the multiple transmit/receive arrays. A spacing between adjacent arrays is indicated by an array of similarly-configured "dark" fibers (i.e., fibers that are not coupled to any optical source or receiver). As before, a break in symmetry is imposed between the upper fiber arrays 76 and common port 75, as well as between common port 75 and lower fiber arrays 79.

Figure 15:
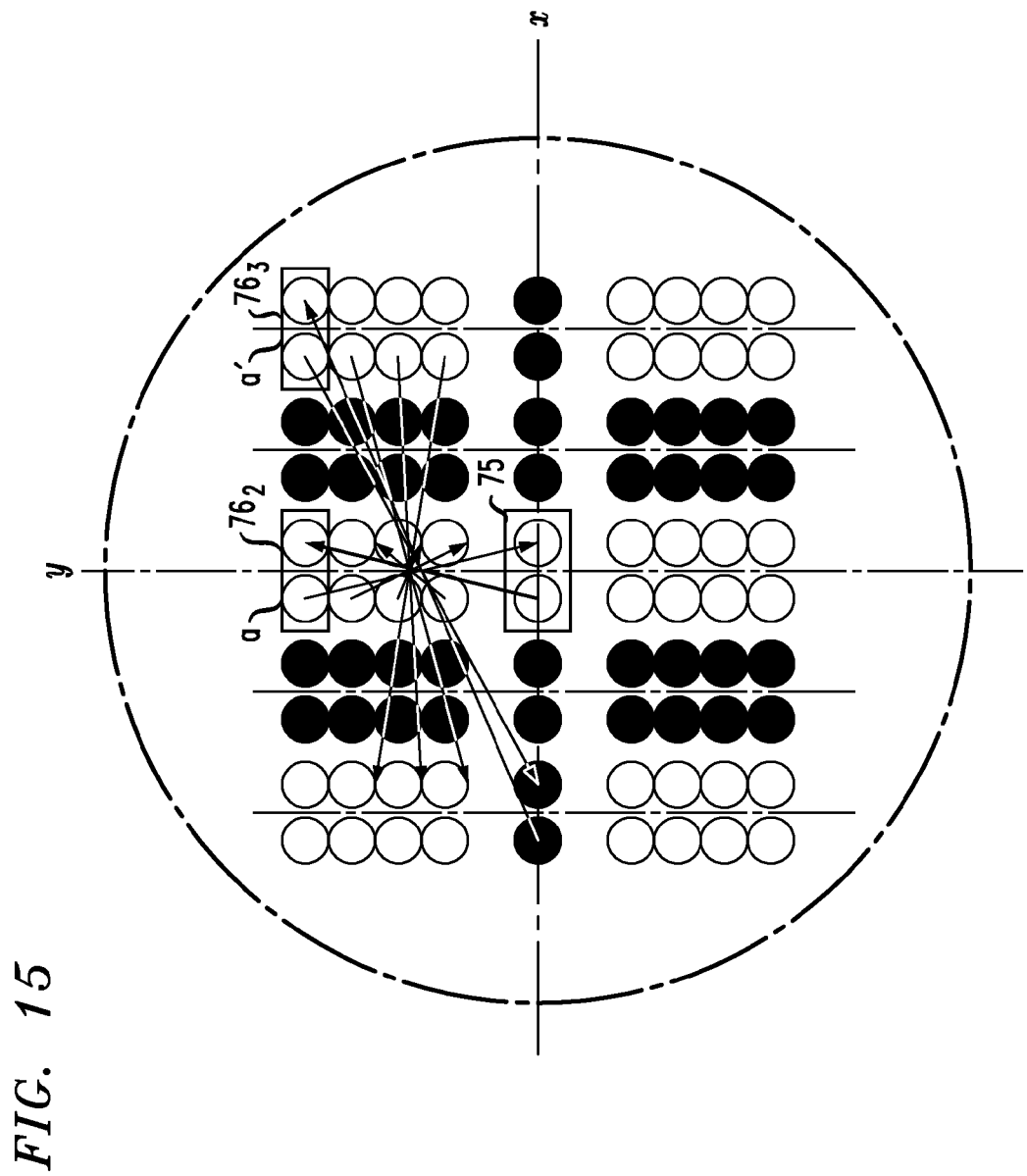

FIG. 15 illustrates the ability of the biaxially-symmetric properties of multi-array DGS 80 (again formed with a break in symmetry between the multiple fiber arrays and common port 75) to provide high directivity between the selected channel and common port 75. In the particular orientation shown in FIG. 15, it is desired to couple channel a of transmit/receive array 76₂ to common port 75. The orientation of MEMS mirror 74 that provides this coupling will also couple, for example, channel a' into ports along the x-axis. However, since these ports consist of "dark fiber" and are removed from common port 75, no un-wanted signals will interfere with the selected channel. As also shown in FIG. 15, this orientation of MEMS mirror 74 will direct the non-selected signals into regions between fibers of the other arrays, minimizing optical-cross talk.

Figure 16:
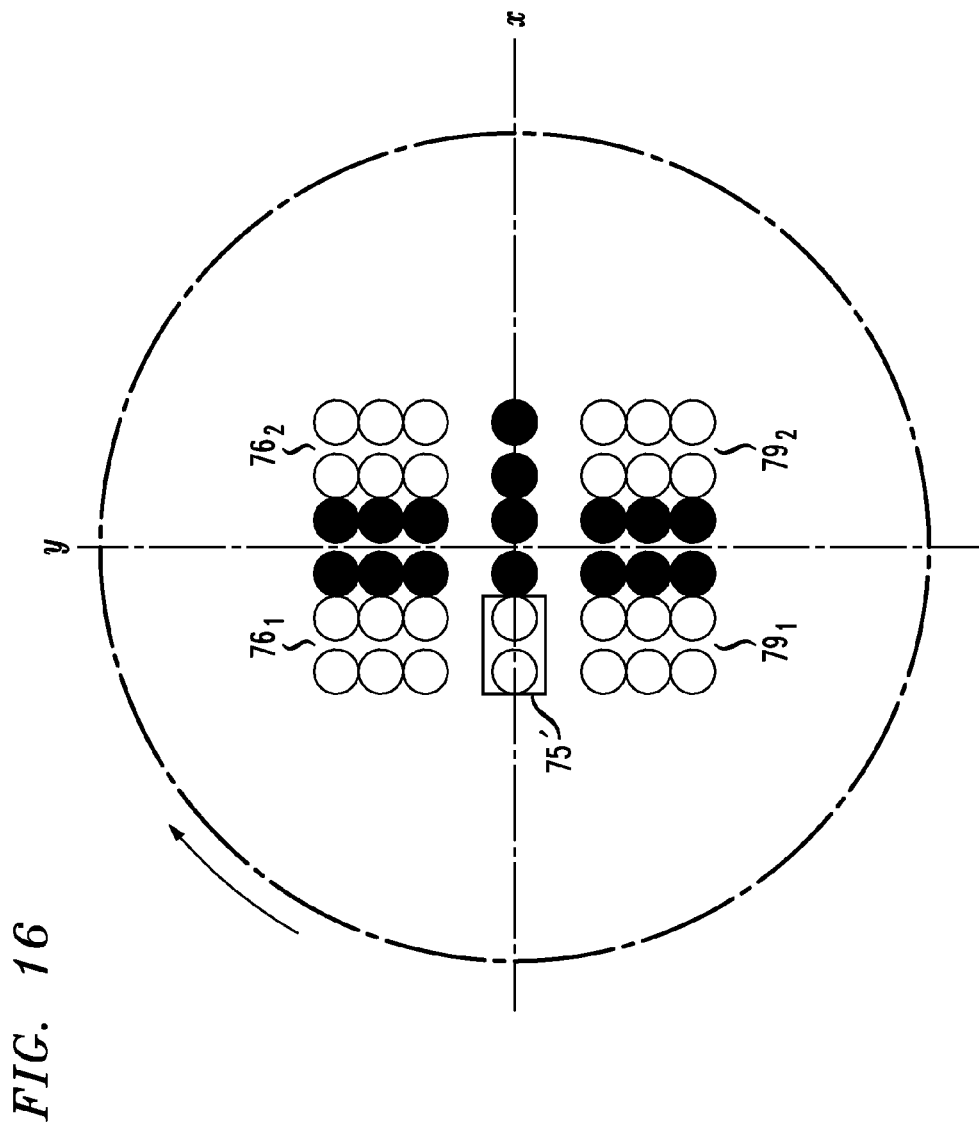

It is to be understood that this type of multi-array configuration may utilize any desired pair of optical signal ports along the optical axis as the device common port. FIG. 16 illustrates yet another multi-array DGS, in this case using the far-left pair of optical signal ports along the x-axis as a device common port, shown as common port 75' in FIG. 16.

As discussed in detail above, when an optical communication device desires to change the "channel" it is utilizing with the optical communication network, it sends a control signal C to the DGS, requesting that a different pair of transmit/receive fibers from the network arrays of fibers be used. In response to this control signal, the biaxially-symmetric signal redirection element re-orients its position, and in the process causes the various received signals to pass across one or more intermediate ports (i.e., the beams "hit" these intermediate ports). This action of the signal redirection element typically results in coupling unwanted light (albeit short in duration) into these intermediate ports, resulting in undesirable crosstalk between channels. In this context, it is desirable to provide "hitless" switching to minimize undesired crosstalk during re-positioning of the beam deflecting element to direct ("switch") an input spectral channel beam to a desired output port.

Figure 17:
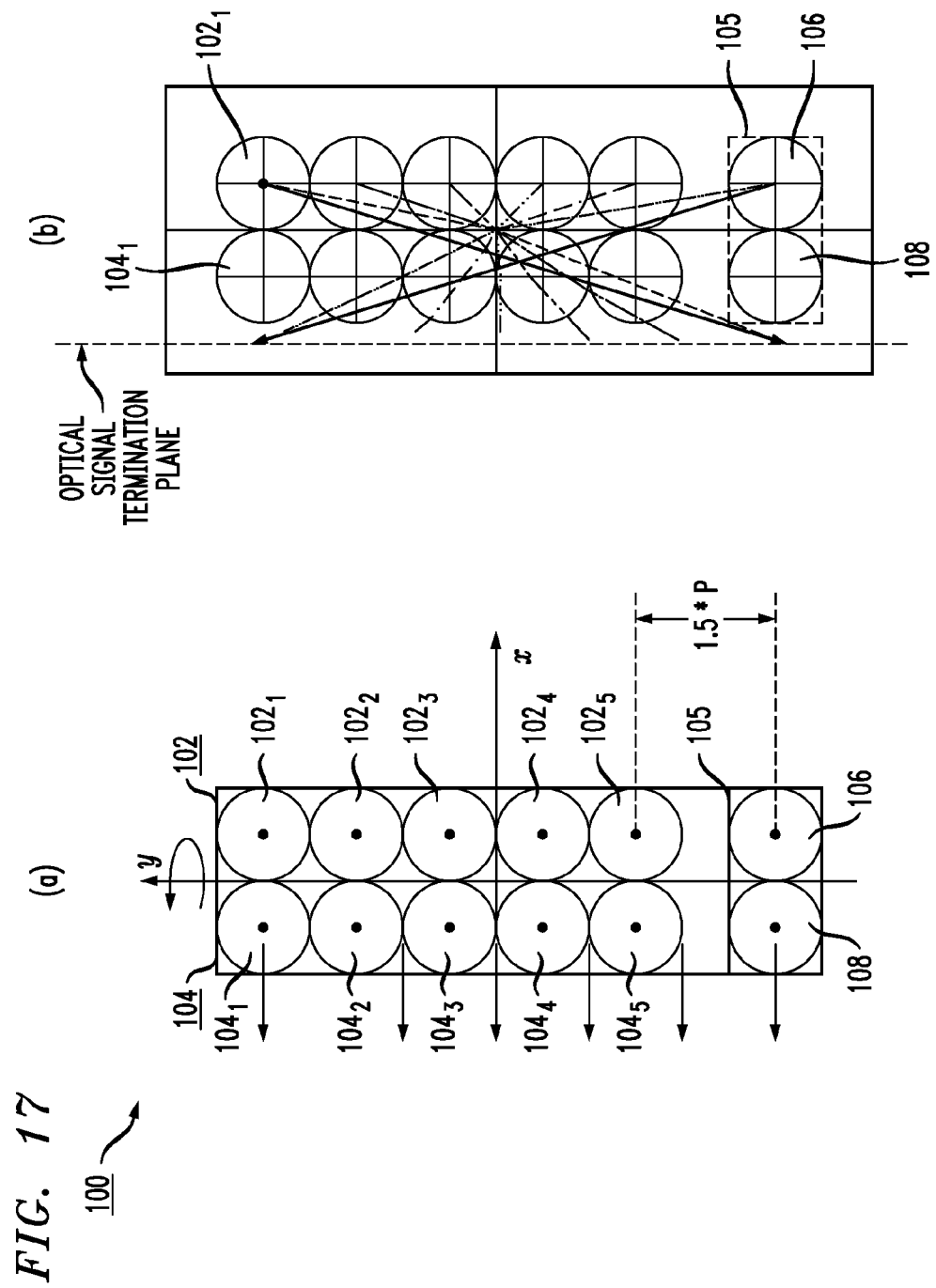
Figure 18:
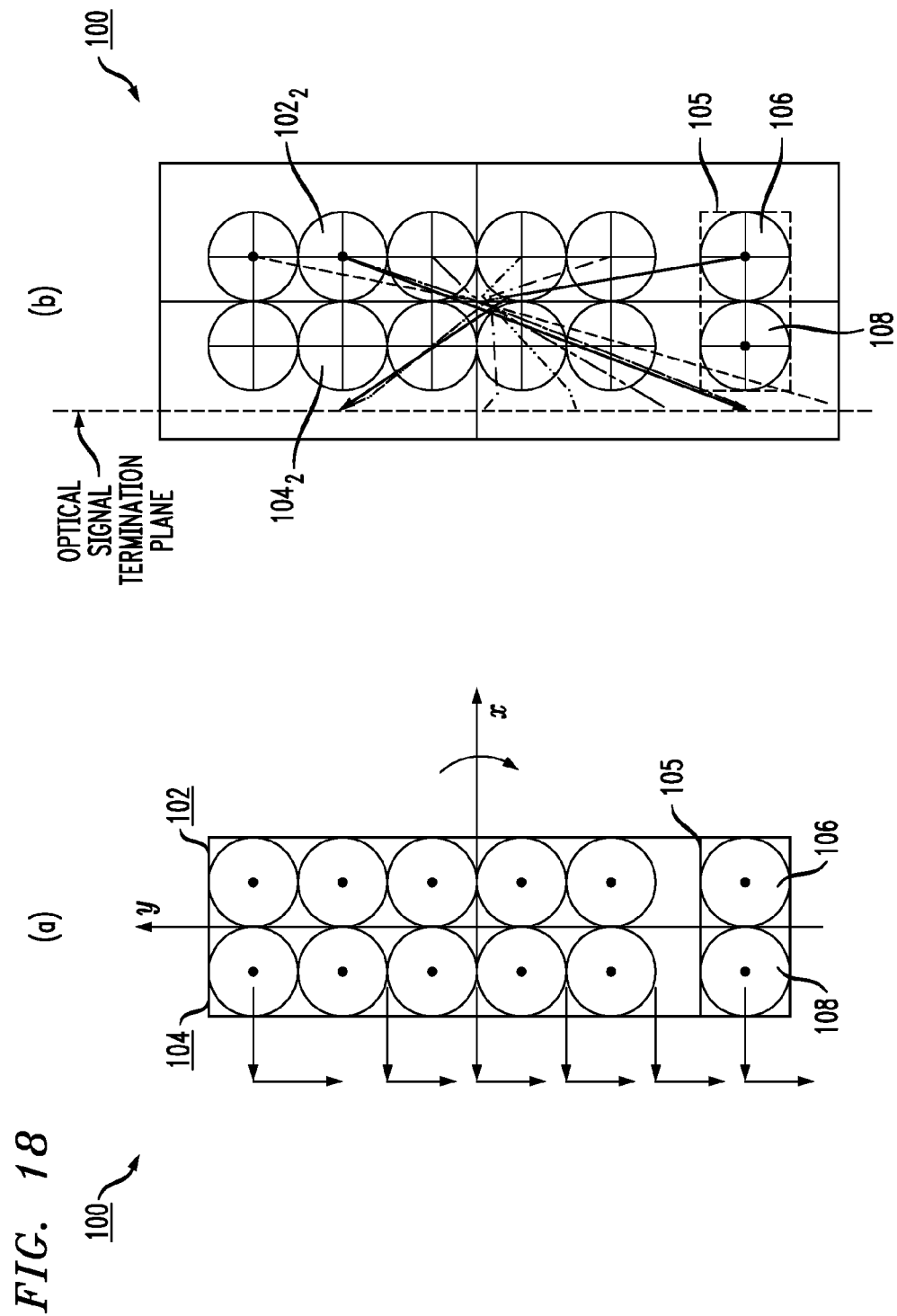

It is possible to provide "hitless" switching in the array configurations of a dual-ganged switch in accordance with the present invention by controlling the movements of the biaxially-symmetric signal redirection element such that the optical signals remain displaced from the core regions of the fibers during the switching process. One exemplary set of steps that may be used to perform this hitless switching is shown in FIGS. 17-19 and explained in detail below. While this particular arrangement does not include the additional gap spacing between fibers, it is to be understood that the specific "hitless" process described in the following is equally applicable to that type of structure.

FIG. 17 illustrates an exemplary fiber array structure 100 that includes a receive fiber array 102 (in this case comprising a set of five separate fibers $102_1$-$102_5$) and a transmit fiber array 104 (again, comprising a set of five separate fibers $104_1$-$104_5$). A device common port 105 (including a transmit fiber 106 and a device receive fiber 108) is also included in the fiber array structure 100, where common port 105 is located in a position that breaks the symmetry with arrays 102 and 104. In particular, common port 105 is shifted downward along the y-axis of the system such that a pitch that is one and a half times greater than the array pitch is formed. For the purposes of discussion, it is presumed that the associated biaxial signal redirection element (e.g., a biaxial MEMS device) is oriented such that the optical data signal $R_1$ from receive array fiber $102_1$ is coupled into device receive fiber 108, and the transmitted optical signal $T_O$ propagating along device transmit fiber 106 is coupled into transmit array fiber $104_1$.

Now, suppose that the associated optical communication device (or any other control element in the network) sends an updated channel control signal C to the dual-ganged switch associated with fiber array structure 100, requesting movement of the switch such that receive array fiber $102_2$ is coupled to device receive fiber 108, and device transmit fiber 106 is coupled to transmit array fiber $104_2$ (e.g., "change to channel 2"). In a first exemplary step of providing a "hitless" switching operation, the biaxial MEMS device (not shown) associated with fiber array structure 100 is rotated about the y-axis of the configuration. As shown in FIG. 17(a), this rotation about the y-axis results in a translation of the optical signals exiting receive fiber array 102 along the x-axis direction. After the rotation, signals $R_2$, $R_3$, $R_4$ and $R_5$ (which had previously terminated at the outer boundaries of the fibers forming transmit array 104) are now adjacent to (or even to the left of) transmit fiber array 104. As particularly shown in FIG. 17(b), the signal $R_1$ that had previously been coupled into device receiver fiber 108 is now decoupled from fiber 108. Similarly, transmitted signal $T_O$ previously coupled to transmit array fiber $104_1$ is also decoupled.

After this y-axis rotation, the biaxial MEMS device is rotated about the x-axis of the optical system, resulting in a translation of the optical signals along the y-axis direction. This x-axis rotation step is shown in FIG. 18(a). As with the initial y-axis rotation step, this rotation also results in translating the optical signals along a region beyond the periphery of fiber array structure 100, providing the desired "hitless" switching function. The amount of rotation about the x-axis is controlled such that the desired channel pair (in this case, fibers $102_2$ and $104_2$) will now be coupled to common port 105. As shown in FIG. 18(b), this x-axis rotation maintains the paths of each light beam outside of the fiber array.

Once the proper amount of x-axis rotation has been achieved, a second y-axis rotation is performed (opposite in direction with respect to the first rotation), as shown in FIG. 19(a). At the completion of this rotation, optical signal $R_2$ exiting receive array fiber $102_2$ will now be in alignment with the core region of device receive fiber 108, as shown in FIG. 19(b). Obviously, transmitted signal $T_O$ propagating along device transmit fiber 106 will now be coupled into transmit array fiber $104_2$. Therefore, at the end of this third rotation, the desired optical channel associated with the requested change will now be associated with the common port of the communication optical device, Since the rotations are controlled to occur beyond the boundaries of fiber arrays 102 and 104, the switching is said to be "hitless", since the plurality of received optical signals associated with fiber array 102 is shifted to a location beyond the fiber array structure during the switching operation; thus, no intermediate fibers will receive any stray light, and the possibilities for optical crosstalk are essentially eliminated.

As mentioned above, the dual-ganged switch configuration of the present invention is considered to be a significant improvement over conventional optical switching arrangements that utilized separate one-dimensional arrays of transmit and receive fibers, with separate and distinct elements for controlling the switching between these arrays and a communication device common port. Indeed, the configuration of the present invention requires only have the number of switches when compared to prior art arrangements.

Figure 20:
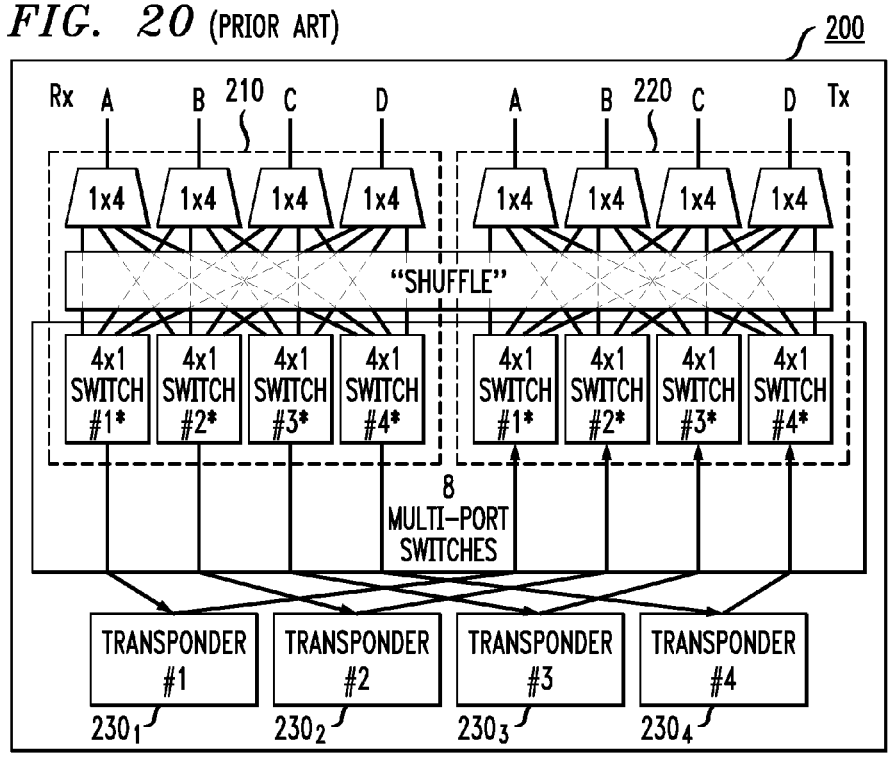
FIG. 20 is a simplified diagram of a prior art multicast switch architecture.

FIG. 20 shows an exemplary architecture of a prior art multicast optical switching configuration 200. Configuration 200 is shown as include a receive (drop) module 210, a transmit (add) module 220, and a set of four separate transponders $230_1$, $230_2$, $230_3$ and $230_4$ that need to communicate with both receive module 210 and transmit module 220. Receive module 210 is shown as including a set of four 1×4 optical splitters $212_1$, $212_2$, $212_3$ and $212_4$, each responsive to a different received optical signal (shown as signals A, B, C and D in FIG. 20). Each splitter creates four copies of the received signal, sending a copy of the received signal to each one of a set of 4×1 switches 214 included within receive module 210. For example, 1×4 optical splitter $212_3$ sends received signal C to each one of switches $214_1$, $214_2$, $214_3$ and $214_4$, as shown module 210. Switches 214 are then controlled to direct which one of received signals A, B, C and D are sent to transponders 230. Transmit module 220 functions in a similar fashion, but in the opposite direction, where the outputs from a set of 4×1 switches 222 are applied as separate inputs to a set of 1×4 optical combiners, providing the "added" transmit signals A, B, C and D.

For this relatively simple configuration, a set of eight total 4×1 switches are required, the set of four switches 214 in module 210 and the set of four switches 222 in module 212. As mentioned above, the realization that the transmit and receive signal paths are necessarily "ganged" when performing optical channel switching (such as in a multicast switch) is the basis for providing dual-ganged optical switching in accordance with the present invention. The use of a biaxially-symmetric signal redirection element permitting this type of dual-ganged switching to be easily and quickly achieved in a configuration that is considered to be more robust and cost efficient than the prior art—and requiring the use of only have the number of switches.

Figure 21:
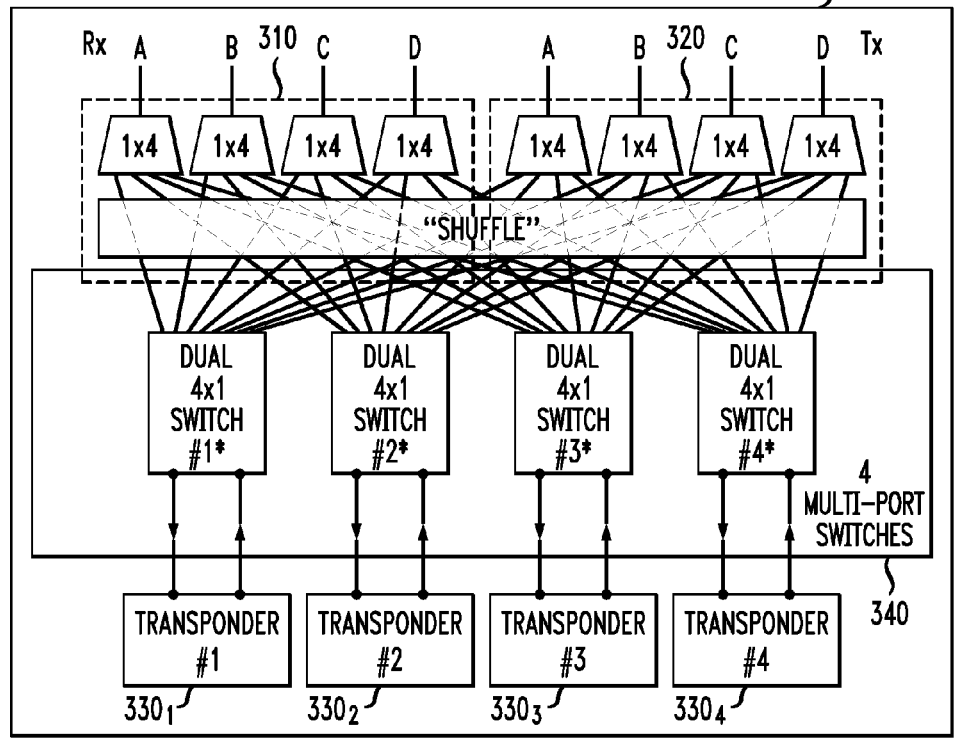
FIG. 21 is a diagram of a multicast optical switch formed in accordance with the present invention, illustrating the reduction in the number of individual switching components as compared to the prior art arrangement of FIG. 20.

FIG. 21 illustrates a similar switching architecture as shown in FIG. 20, but in this case exhibiting a significantly reduced overall component count, using a set of four dual-ganged switches formed in accordance with the present invention in place of the set of eight 4×1 switches required by the prior art. Referring to FIG. 21, arrangement 300 is shown as including a receive component 310, which comprises a set of 1×4 optical splitters 312, similar to splitters 212 shown in FIG. 20, with each splitter $312_i$ configured to receive a different signal A, B, C or D. A transmitter component 320 is shown as including a set of 4×1 optical combiners 322, again used to pass the signal received on one of separate input fibers to its associated output. A set of four transponders 330 is also shown in the switching architecture of FIG. 21.

In accordance with the present invention, a DGS module 340 is disposed between the 1×4 splitter/combiners and the set of transponders 300, with module 340 used to control the switching between the various transmit/receive signal paths and the set of transponders. Since the transmit and receive signal paths of a given signal port are always switched as a "pair" to a common port of a transponder, the use of a dual-ganged switch in the manner described above is able to perform this switching for a multiple number of transponders, as shown. In particular, it is shown in FIG. 21 that a first DGS $340_1$ is coupled to a first transponder $330_1$ (at a common port $340_{12}$), and includes a receive fiber array 342 that includes a set of fibers (signal paths) coupled to each of the 1×N optical splitters 312 including in receive component 310. A transmit fiber array 344 is shown as coupled between first DGS $340_1$ and each of the separate 1×4 optical combiners 322 of transmit component 320. The remaining DGSs 340 and transponders 330 are similarly paired. The significant savings in component count and complexity is obvious. Moreover, by virtue of the biaxial symmetry displayed by the DGS, the transmit and receive switching will occur simultaneously, without the need to use other components to control/synchronize the operation of the optical switch.

Indeed, it will be appreciated by those skilled in the art that various modifications and variations can be made in the dual-ganged optical switch of the present invention without departing from the spirit or scope of the invention. Thus, it is intended that the present invention cover these modifications and variations, provided they come within the scope of the claims appended hereto and their equivalents.

What is claimed is:

1. A dual-ganged optical switch for simultaneous switching of a transmit signal path and a receive signal path with respect to a common port of an associated communication device, the dual-ganged optical switch comprising:

an optical waveguiding structure oriented in an x-y plane and including a 1×N array of receive optical waveguides disposed along a y-direction in the x-y plane and a 1×N array of transmit optical waveguides disposed adjacent to the 1×N array of receive optical waveguides such that each transmit optical waveguide is aligned in an x-direction with a separate one of receive optical waveguides, with each adjacent pair of receive and transmit optical waveguides defining an optical channel, the optical waveguiding structure further comprising a device common port including a device transmit optical waveguide disposed in y-direction alignment with the 1×N array of receive optical waveguides and a device receive optical waveguide disposed adjacent to the device transmit optical waveguide and in y-direction alignment with the 1×N array of transmit optical waveguides;

a biaxially-symmetric optical signal redirection element providing simultaneous left-right (y-axis) and top-down (x-axis) optical signal redirection within the x-y plane, the biaxially-symmetric optical signal redirection element disposed to couple optical signals between a selected optical channel and the device common port such that an optical signal propagating along a receive optical waveguide of the selected optical channel is redirected in the device receive optical waveguide of the common port and an optical signal exiting the common port along the device transmit optical waveguide is redirected into a transmit optical waveguide of the selected optical channel; and a collimating lens disposed in an optical signal path between the optical waveguiding structure and the optical signal redirection element, wherein switching between optical channels coupled to the common port is controlled by reorienting the biaxially-symmetric optical signal redirection element in both the x-direction and the y-direction so as to change the selected optical channel that intercepts the redirection element while also maintaining coupling with the device common port, providing dual-ganged switching of the transmit and receive signal paths.

2. The dual-ganged optical switch as defined in claim 1 wherein the 1×N array of receive optical waveguides comprises a 1×N array of optical fibers and the 1×N array of transmit optical waveguides comprises a 1×N array of optical fibers.

3. The dual-ganged optical switch as defined in claim 1 wherein the optical communication device receive/transmit optical waveguides comprise a pair of optical fibers.

4. The dual-ganged optical switch as defined in claim 1 wherein the biaxially-symmetric optical signal redirection element comprises a micro-electro-mechanical-system (MEMS)-based mirror.

5. The dual-ganged optical switch as defined in claim 1 wherein the biaxially-symmetric optical signal redirection element is selected from the group consisting of: a MEMS-based mirror, a liquid-crystal-based switching element, a piezoelectric-based switching element, an acousto-electric switching element, and a liquid-crystal-on-silicon switching element.

6. The dual-ganged optical switch as defined in claim 1 wherein coupling between non-selected transmit and receive optical waveguides is reduced by setting a position of the device common port to create a non-symmetric configuration, wherein the biaxially-symmetric optical signal redirection element is reoriented along both the x-axis and y-axis to compensate for the non-symmetric configuration.

7. The dual-ganged optical switch as defined in claim 6 wherein each 1×N array of optical waveguides exhibits a predetermined pitch P defined as a spacing between a center of a first optical waveguide and a center of a second optical waveguide, and the device common port is ports are disposed to create a spacing of 1.5*P between the 1×N arrays of optical waveguides and the device common port.

8. The dual-ganged optical switch as defined in claim 6 wherein each 1×N array of optical waveguides comprises two separate arrays, including a 1×M array disposed above the common port and a 1×(N−M) array disposed below the common port, where 1<M<N and each separate array exhibits a predetermined pitch P defined as a spacing between a center of a first optical waveguide and a center of a second optical waveguide, and the device common port is disposed to create a spacing of 1.5*P between the common port and each separate array, yielding a spacing of 3.0*P between the separate arrays.

9. The dual-ganged optical switch as defined in claim 1 wherein each 1×N array of optical waveguides includes a predetermined gap spacing between adjacent receive optical waveguides, and the same predetermined gap spacing between adjacent transmit optical waveguides.

10. The dual-ganged optical switch as defined in claim 9 wherein each 1×N array of optical waveguides exhibits a predetermined pitch $P_g$ as a spacing between a center of a first optical waveguide and a center of a second optical waveguide including the gap therebetween, with the device common port disposed to create a spacing of $1.5*P_g$ between the 1×N arrays of optical waveguides and the device common port.

11. A dual-ganged optical switch for controlling the connection between a selected optical transmit/receive channel of a plurality of channels and an optical communication device common port comprising a receive/transmit optical waveguide pair, the dual-ganged optical switch comprising:

an optical waveguiding array structure oriented in an x-y plane and including a two-dimensional array of a plurality of receive optical waveguides disposed along both an x-direction dimension and a y-direction dimension and a two-dimensional array of a plurality of transmit optical waveguides disposed along both the x-direction dimension and the y-direction dimension and disposed in an adjacent configuration to the two-dimensional array of a plurality of receive optical waveguides, with adjacent receive and transmit optical waveguides defining an optical channel, the optical waveguiding array structure further comprising a device common port structure comprising a plurality of device transmit optical waveguides disposed below and aligned with the two-dimensional array of the plurality of receive optical waveguides and a plurality of device receive optical waveguides disposed below and aligned with the two-dimensional array of the plurality of transmit optical waveguides;

a biaxially-symmetric optical signal redirection element providing simultaneous left-right (y-axis) and top-bottom (x-axis) optical signal redirection within the x-y plane, the biaxially-symmetric optical signal redirection element disposed to couple optical signals between a selected optical channel and a selected device common port such that an optical signal propagating along the array receive optical signal path of the selected optical channel is redirected in the device received signal path and an optical signal propagating along the device transmit signal path is redirected into the array transmit signal path of the selected optical channel; and a collimating lens disposed in an optical signal path between the optical waveguiding structure and the biaxially-symmetric optical signal redirection element, wherein switching between optical channels coupled to the common port is controlled by rotating the biaxially-symmetric optical signal in both the x-direction and the y-direction so as to change the array pair of signal paths that intercept the redirection element while also maintaining coupling with the device common port, providing dual-ganged switching of the transmit and receive signal paths.

12. A method of switching between channels of a dual-ganged optical switch comprising an optical array structure including a 1×N array of receive optical waveguides and a 1×N array of transmit optical waveguides, the 1×N arrays of optical waveguides disposed in a symmetric relationship, with a selected pair of receive and transmit optical waveguides defining an optical channel, the optical waveguiding array structure further comprising a common port including a device transmit optical waveguide and a device receive optical waveguide, wherein a biaxially-symmetric optical signal redirection element is used to couple a selected optical channel with the common port by providing optical signal redirection therebetween, the method including the steps of:

upon receiving a control message to switch communication with the common port from a first channel to a second channel, rotating the biaxially-symmetric optical signal redirection element with respect to an optical system y-axis to translate optical signal origination and termination locations along an x-axis direction of the optical system to a position beyond the optical array structure;

rotating the biaxially-symmetric optical signal redirection element with respect to the optical system x-axis to translate optical signal origination and termination locations along the y-axis direction by an amount associated with a physical separation between the first and second channels; and rotating the optical signal redirection element with respect to the optical system y-axis to translate optical signal original and termination locations along the x-axis direction to align the selected second channel receive and transmit optical signal paths with the device common port.

13. The method as defined in claim 12, wherein coupling between non-selected transmit and receive signal paths is reduced by setting a position of the device common port with respect to the receive and transmit signal paths.

14. A multicast optical switching system for providing communication between a plurality of N transponders, a plurality of N 1×N optical splitters for receiving a plurality of N separate receive optical signals and a plurality of N ×1 optical combiners for transmitting a plurality of N separate transmit optical signals, the multicast optical switching system including a plurality of N dual-ganged optical switches, each dual-ganged optical switch associated with a transponder in a one-to-one relationship, each dual-ganged optical switch comprising

- an optical waveguiding structure oriented in an x-y plane and including a 1×N array of receive optical waveguides disposed along a y-direction in the x-y plane and a 1×N array of transmit optical waveguides disposed adjacent to the 1×N array of receive optical waveguides such that each transmit optical waveguide is aligned in an x-direction with a separate one of receive optical waveguides, with each adjacent pair of receive and transmit optical waveguides defining an optical channel, the optical waveguiding structure further comprising a device common port including a device transmit optical waveguide disposed in y-direction alignment with the 1×N array of receive optical waveguides and a device receive optical waveguide disposed adjacent to the device transmit optical waveguide and in y-direction alignment with the 1×N array of transmit optical waveguides;
- a biaxially-symmetric optical signal redirection element providing simultaneous left-right (y-axis) and top-down (x-axis) optical signal redirection within the x-y plane, the biaxially-symmetric optical signal redirection element disposed to couple optical signals between a selected optical channel and the device common port such that an optical signal propagating along a receive optical waveguide of the selected optical channel is redirected in the device receive optical waveguide of the common port and an optical signal exiting the common port along the device transmit optical waveguide is redirected into a transmit optical waveguide of the selected optical channel; and
- a collimating lens disposed in an optical signal path between the optical waveguiding structure and the optical signal redirection element, wherein switching between optical channels coupled to the common port is controlled by reorienting the biaxially-symmetric optical signal redirection element in both the x-direction and the y-direction so as to change the selected optical channel that intercepts the redirection element while also maintaining coupling with the device common port, providing dual-ganged switching of the transmit and receive signal paths.

* * * * *